United States Patent
Seki et al.

[11] Patent Number: 5,812,761
[45] Date of Patent: Sep. 22, 1998

[54] DISK ARRAY SYSTEM

[75] Inventors: Kazuhisa Seki; Naoki Ohtake, both of Kawasaki, Japan

[73] Assignee: Fujitsu Limited, Kawasaki, Japan

[21] Appl. No.: 739,965

[22] Filed: Oct. 30, 1996

[30] Foreign Application Priority Data

Dec. 14, 1995 [JP] Japan ..................... 7-325358

[51] Int. Cl.⁶ .................. G11B 19/02; G06F 3/03
[52] U.S. Cl. ................ 395/185.07; 711/114; 395/182.04
[58] Field of Search ............. 395/182.04, 182.05, 395/185.07; 360/77.04; 371/40.1; 711/114, 162

[56] References Cited

U.S. PATENT DOCUMENTS

| | | | |
|---|---|---|---|
| 5,303,219 | 4/1994 | Kulakowski et al. | 369/54 |
| 5,420,998 | 5/1995 | Horning | 395/440 |
| 5,455,724 | 10/1995 | Suzuki et al. | 360/77.04 |
| 5,521,773 | 5/1996 | Suzuki et al. | 360/77.04 |
| 5,596,458 | 1/1997 | Emo et al. | 360/48 |

FOREIGN PATENT DOCUMENTS

| | | |
|---|---|---|
| S60-211536 | 10/1985 | Japan . |
| S61-024074 | 2/1986 | Japan . |
| S63-044375 | 2/1988 | Japan . |
| S63-180136 | 7/1988 | Japan . |
| H03-240123 | 10/1991 | Japan . |
| H04-205759 | 7/1992 | Japan . |

*Primary Examiner*—Ly Hua
*Attorney, Agent, or Firm*—Staas & Halsey

[57] ABSTRACT

A disk array system includes a disk array, an array controller, an offtrack detecting unit, an error processing unit, an offtrack measuring unit, a reformat control unit, and a reformat processing unit. The disk array includes a plurality of disk devices storing a plurality of data in parallel and storing redundant data used for restoring data lost if one of the plurality of data is lost. The array controller controls input from or output to the disk array based on a request from an upper system, such as a host computer. The offtrack detecting unit is provided in each of the disk devices for detecting offtrack and informing the array controller of the offtrack. Further, an error processing unit is provided in the array controller for logically disconnecting a disk device having communicated information if offtrack detection information is received from the offtrack detecting unit, and for issuing a diagnostic I/O command. In addition, an offtrack measuring unit is provided in each of the plurality of disk devices for measuring the offtrack from servo information recorded in an offtrack measurement cylinder. The reformat control unit is provided in the array controller for issuing a reformat command to the disk device. In addition, the reformat processing unit of the present invention is provided in each of the disk devices for rewriting servo cylinder information onto the data surface of the disk medium.

23 Claims, 17 Drawing Sheets

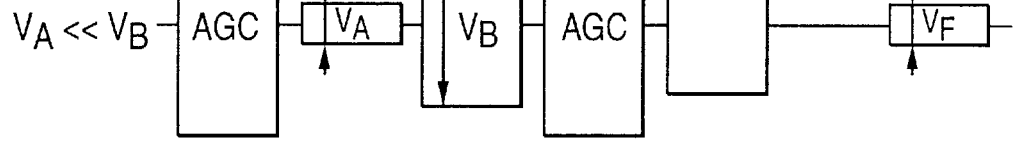
FIG. 7(A) LARGE OFFTRACK IN THE OUTER SIDE $V_A \ll V_B$
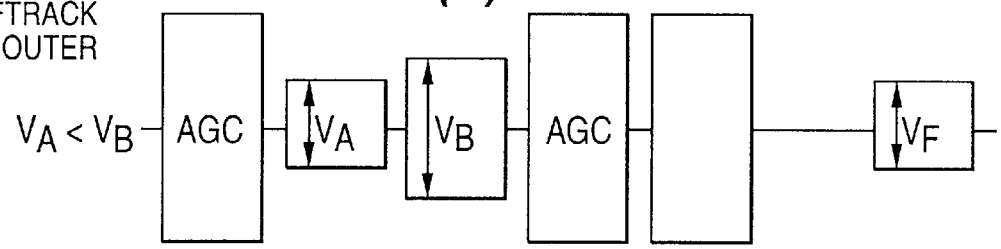
FIG. 7(B) SMALL AMOUNT OF OFFTRACK IN THE OUTER SIDE $V_A < V_B$
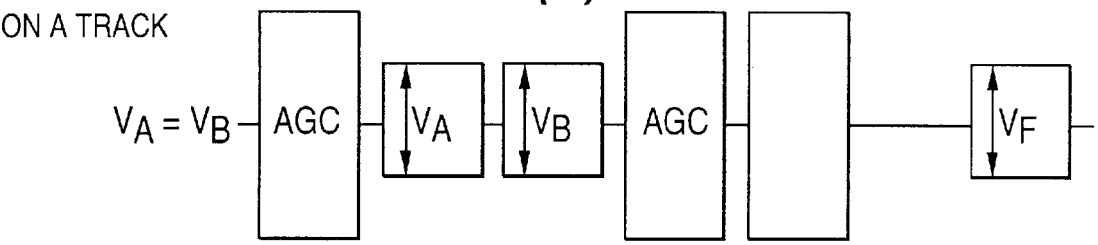
FIG. 7(C) ON A TRACK $V_A = V_B$
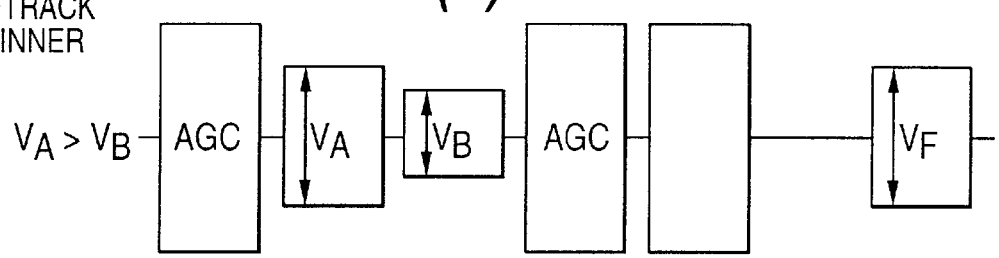
FIG. 7(D) SMALL AMOUNT OF OFFTRACK IN THE INNER SIDE $V_A > V_B$
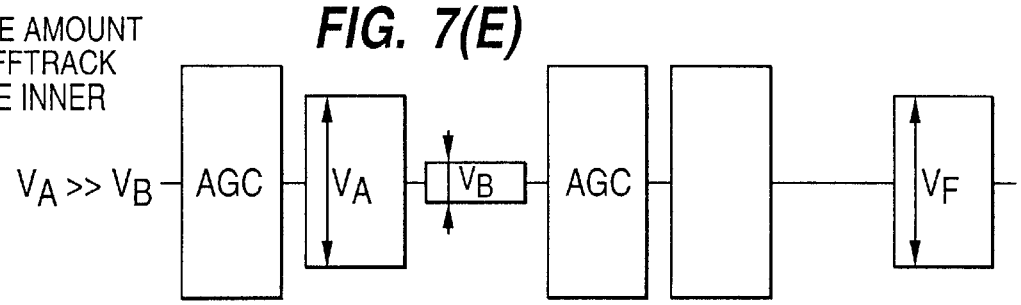
FIG. 7(E) LARGE AMOUNT OF OFFTRACK IN THE INNER SIDE $V_A \gg V_B$

DISK ARRAY SYSTEM

BACKGROUND OF THE INVENTION

1. Field of the Invention

The present invention relates to a disk array system for accessing a plurality of disk drives in parallel to perform input/output (I/O) processing, and in particular, relates to a disk array system that can recover without replacing a disk drive having an error when an offtrack error of the disk drive reaches the measurable limit.

2. Description of the Related Art

As external storage devices for computer systems, disk devices such as magnetic disk devices and optical disk devices are commonly used. The characteristics of the foregoing disk devices are non-volatile recording, large capacity, and high-speed data transfer. Requirements placed on disk devices are high-speed data transfer, high reliability, large capacity, and low price. A disk array system has gradually gained attention as one of the disk devices fulfilling these requirements. The disk array system is a system having a plurality of small disk devices, recording data separately into these devices, and accessing the devices in parallel.

If data transfer is performed in parallel from or to a plurality of disk devices of a disk array system, higher speed data transfer is achieved, relative to data transfer from or to a single disk device, the ratio of which is equal to the number of disk devices. Further, by recording redundant information like parity data in addition to data, data errors caused by failure of a disk device are detected and corrected data errors. Hence, the same level of high reliability as on the dual disk system can be achieved by the disk array system, and with a lower cost per byte than that of the dual disk system.

Among magnetic disk devices used for a disk array system, a disk device using a servo-surface servo uses a dedicated servo-surface to record only the servo information, and a dedicated servo head to detect a head position. Further, by positioning the servo head to a target cylinder, the device positions a data head, assembled with the servo head in an actuator, to a target cylinder of a data surface.

The disk device using the servo-surface servo records servo information for measuring offtrack (also referred to as "offset", and meaning not precisely aligned with a track, errors on a data surface, for example, an outer guard band. The cylinder on a data surface for measuring the amount of offtrack is referred to as a servo cylinder. In the servo information in the servo cylinders, servo patterns are recorded to measure the amount of offtrack in the range of, for example, ±0.625 track width against a track center.

At the stage of factory shipping, an amount of offtrack per head is measured for correction of the offtrack and other eccentricities, using this servo cylinder, and is recorded in the guard band area as part of the system information. When the system is activated at startup, the correction values of the offtrack are read from the servo cylinders by a controller as part of the system information. The correction values are used for correction of the offtrack. Further, in operation, for example, at the time of calibration that is activated in accordance with elapsed time, measurement processing of the offtrack is performed to update the amount of offtrack to the value measured at that time.

However, even if such a disk device using servo-surface servo detects the offtrack during its operation, the disk device using servo-surface servo does not itself report the offtrack, but reports an error such as a read error or a seek error. Of course, an error is reported only when recovery from the error does not occur, even if a predetermined number of retries are performed after the error happens.

An array controller detects such an error report from a disk device included in a disk array system as the occurrence of a failure from which the disk device cannot recover. In this case, the failed disk device is logically disconnected from the disk array system, and its readable data that is copied in a reserve disk device prepared as a hot spare, or the newest backup data, is restored. After the above operation, the failed disk device is exchanged for repair.

Here, offtrack errors may occur because of the increase in mechanical displacement of a data head against the servo head results in exceeding the offtrack range measurable with the servo cylinder on the data surface. In this case, by rewriting the servo cylinder on the data surface, the offtrack can be resolved. However, conventional disk devices do not have the ability to detect the offtrack and to inform a disk controller of the offtrack. Hence, it is not clear whether the error is caused by the offtrack or not. Therefore, the device is exchanged for repair as a failed device.

For this reason, a problem in the related art is that a large amount of time is required to exchange and repair a failed disk device. Another problem in the related art is that if an error caused by the offtrack occurs in another disk device in use as the hot spare, the disk array system cannot continue to function. Hence, input/output (I/O) performance is remarkably decreased.

SUMMARY OF THE INVENTION

An object of the present invention is to solve the above-mentioned problems in the related art.

Another object of the present invention is to provide a disk array system that re-uses disk devices included in the disk array system and which have offtrack errors, through adequate error recovery processing without exchanging the disk devices.

Another object of the present invention is to provide disk devices with the ability to detect the offtrack and to inform a disk controller of the offtrack, thereby clarifying whether the error is caused by the offtrack.

A further object of the present invention is to reduce the number of disk devices removed for repair as failed devices.

Still another object of the present invention is to allow a disk array system to continue to function, even if an error caused by the offtrack occurs in another disk device in use as the hot spare.

Still a further object of the present invention is to increase input/output (I/O) performance decreased.

The present invention is a disk array system comprising a disk array, an array controller, an offtrack detecting unit, an error processing unit, an offtrack measuring unit, a reformat control unit, and a reformat processing unit.

In the present invention, the disk array includes a plurality of disk devices not only storing a plurality of data in parallel but also storing redundant data used for restoring data lost if one of the plurality of data is lost. The array controller, in the present invention, controls input from or output to the disk array based on a request from an upper system, such as a host computer.

In the present invention, an offtrack detecting unit is provided in each of the disk devices for detecting offtrack and informing the array controller of the offtrack. Further in the present invention, an error processing unit is provided in the array controller for logically disconnecting a disk device having communicated information if offtrack detection information is received from the offtrack detecting unit, and for issuing a diagnostic I/O command.

In addition, in the present invention, an offtrack measuring unit is provided in each of the plurality of disk devices for measuring the offtrack from servo information recorded in an offtrack measurement cylinder, whose data surface corresponds to that of an offtrack measurement cylinder on a predetermined servo surface, using the offtrack measurement cylinder on the predetermined servo surface of a disk medium as a reference if the diagnostic I/O command is received from the error processing unit, and for transmitting an abnormal end of the command to the array controller if the measured value exceeds a predetermined measurable limit.

The reformat control unit of the present invention is provided in the array controller for issuing a reformat command to the disk device if the unit receives the abnormal end of the command from the offtrack measuring unit. In addition, the reformat processing unit of the present invention is provided in each of the disk devices for rewriting servo cylinder information onto the data surface of the disk medium if the unit receives the reformat command from the reformat control unit.

BRIEF DESCRIPTION OF THE DRAWINGS

These together with other objects and advantages which will be subsequently apparent, reside in the details of construction and operation as more fully hereinafter described and claimed, reference being had to the accompanying drawings forming a part hereof, wherein like numerals refer to like parts throughout.

FIGS. 7(A) to (E) are explanatory wave form charts showing servo read signals corresponding to head positions;

DESCRIPTION OF THE PREFERRED EMBODIMENTS

FIGS. 1 (A) and (B) show explanatory drawings of the principle of the present invention.

Figure 1A:
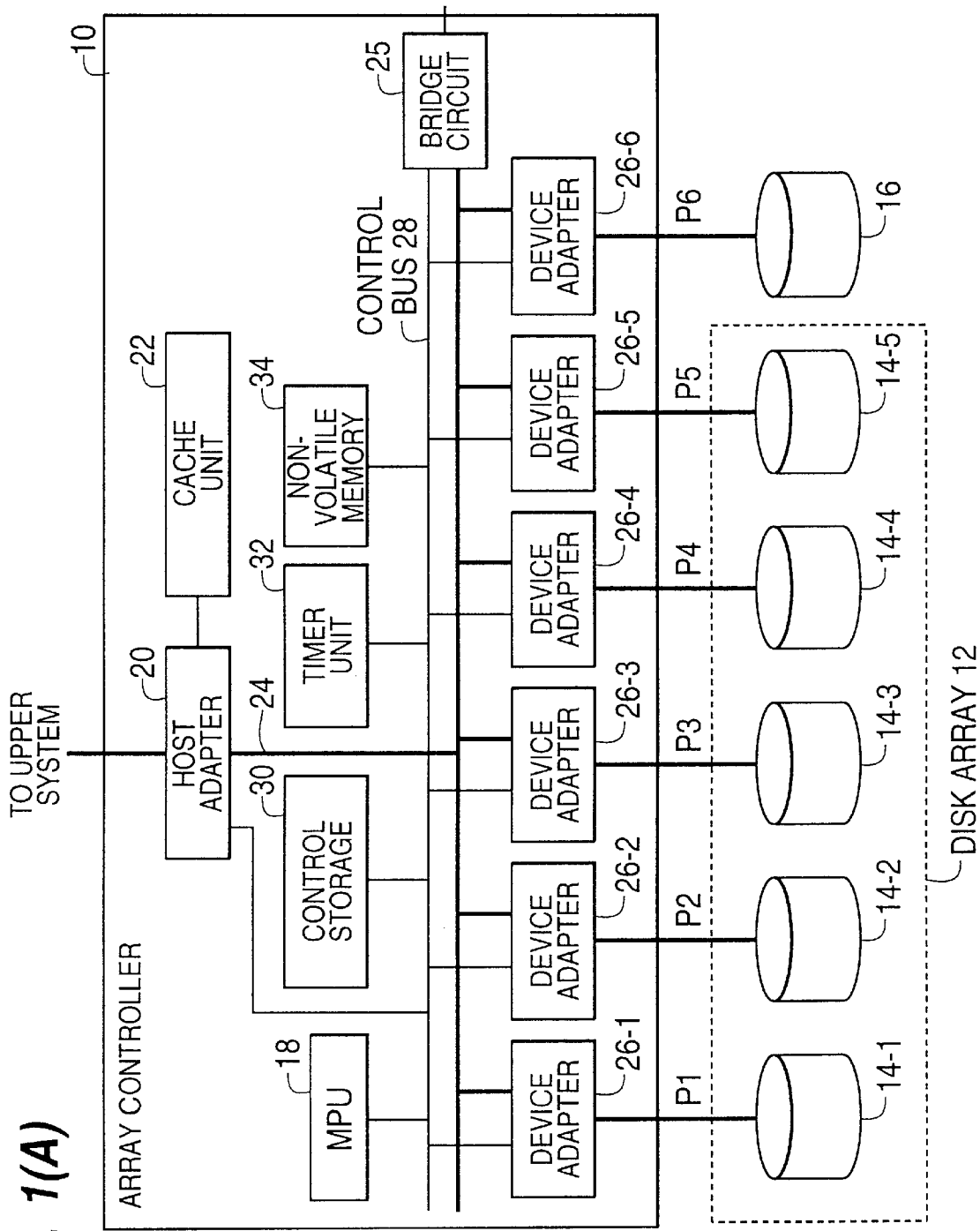
FIGS. 1(A) and (B) are explanatory drawings showing the principle of the present invention.

Referring now to FIG. 1(A), a disk array system according to the present invention comprises an array controller 10 and a disk array 12. The disk array 12, for example, in the case of RAID3, comprises a plurality of disk devices 14-1 to 14-4 and at least one disk device 14-5 saving redundant data used for recovery of data that lost if any of disk devices 14-1 to 14-4 fails. A disk array system in the case of RAID5, for example, is different than the RAID3 configuration in that one disk device is not designated entirely for saving redundant data. Examples of RAID operating modes are presented and explained in *The RAIDBook, A Source Book for RAID Technology*, Edition 1-1, Published by The RAID Advisory Board, St. Peter, Minn., Nov. 18, 1993.

As shown in FIG. 1(A), the array controller 10 controls input/output, that is, read from or write to the disk array 12 based on a request from an upper system, such as a host computer or network device (neither of which are shown in FIG. 1(A)).

Also as shown in FIG. 1(A), disk devices 14-1 to 14-5 and 16 are coupled, respectively, to device adapters 26-1 to 26-6 through channels P1 to P6. Device adapters 26-1 to 26-6 are coupled to control bus 28, which is coupled to bridge circuit 25. Further, bridge circuit 25 is coupled to microprocessor unit 18, control storage 30, timer unit 32, host adapter 20, timer unit 32, and non-volatile memory 34.

Figure 1B:
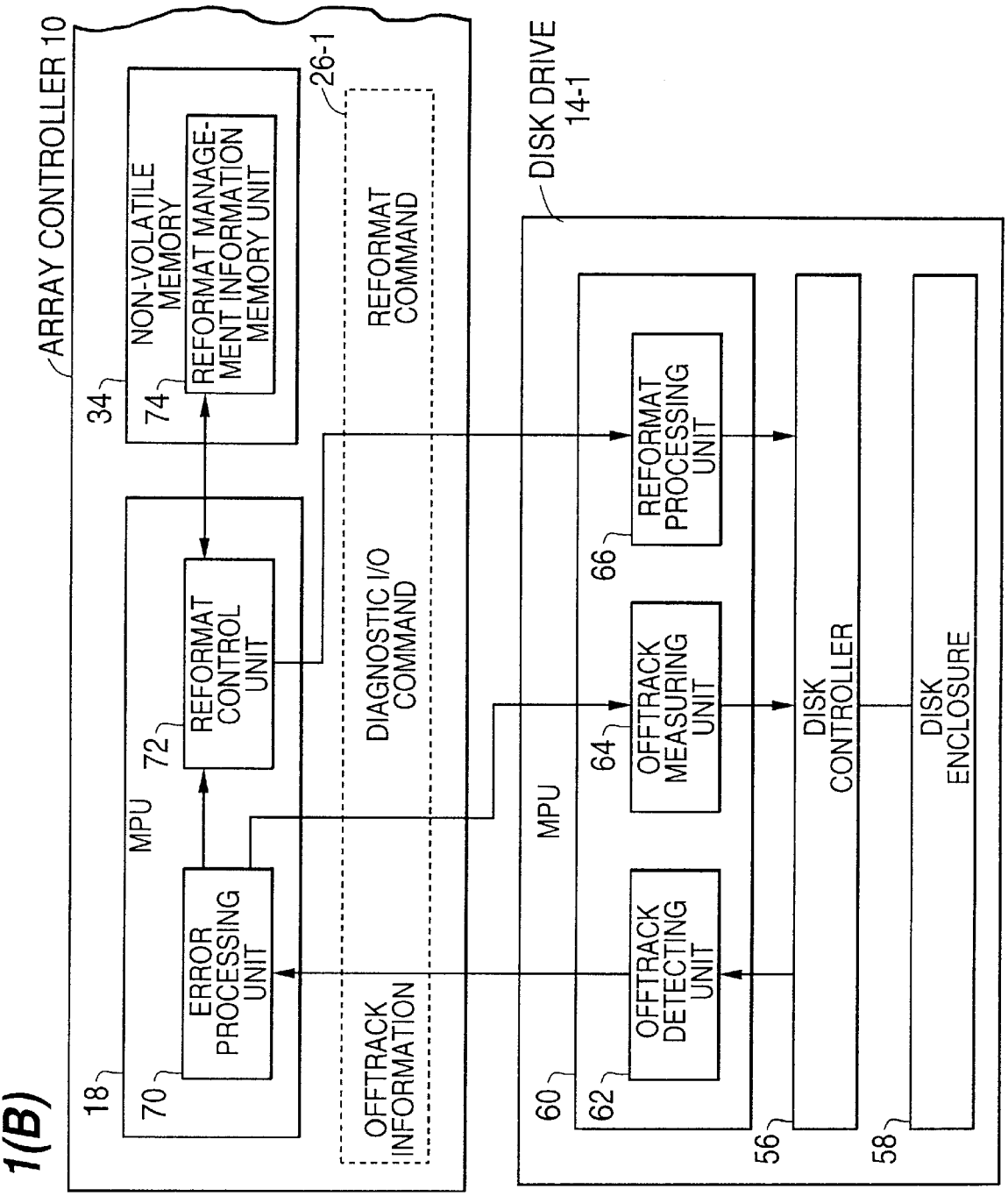

Referring now to FIG. 1(B), in the present invention, the array controller comprises microprocessor unit 18, which comprises an error processing unit 70 and a reformat control unit 72. Each of the disk devices 14-1 to 14-4 included in the disk array 12, for example, as shown in disk device 14-1 representing the disk devices, comprises an offtrack detecting unit 62, an offtrack measuring unit 64, and a reformat processing unit 66.

The offtrack detecting unit 62 in the disk device 14-1 detects an offtrack exceeding an offtrack measurement limit with a servo cylinder, and informs the array controller 10 of the offtrack. The offtrack detecting unit 62 receives the offtrack information from disk controller 56 and disk enclosure 58. For example, the offtrack detecting unit 62 within each disk drive seeks an offtrack measurement cylinder during a time when the disk drive is not being accessed (also referred to as "empty time"), measures an amount of the offtrack, and informs the array controller 10 of the offtrack if the measured value exceeds a threshold value.

The error processing unit 70 of the array controller 10 logically disconnects from the disk array 12 the disk device 14-1 that informed the array controller of the error of being offtrack, and issues a diagnostic I/O command through device adapter 26-1.

When the offtrack measuring unit 64 of the disk device 14-1 receives the diagnostic I/O command from the error processing unit 70 of the array controller 10, the offtrack measuring unit 64 measures the offtrack from the servo information recorded in an offtrack measurement cylinder on a data surface, which corresponds to a predetermined offtrack measurement cylinder, that is, servo cylinder, on the basis of the predetermined offtrack measurement cylinder on a servo surface of a disk medium. If the measured value of the offtrack exceeds the predetermined limit value, the offtrack measuring unit 64 informs the array controller 10 of an abnormal end to the command being executed.

If the reformat control unit 72 of the array controller 10 receives the abnormal-end information from the offtrack measuring unit 64 of the disk device 14-1, the reformat control unit 72 issues a reformat command to the disk device 14-1 through device adapter 26-1.

When the reformat processing unit 66 of the disk device 14-1 receives the reformat command from the reformat control unit 72 of the array controller 10, the reformat processing unit 66 rewrites the servo cylinder information on the data surface of the disk medium.

Processing of the reformat processing unit 66 provided in the disk device 14-1 is performed in accordance with the following procedure:

1. the reformat processing unit 66 saves the system information in a system area of the disk medium, which records the servo information for offtrack measurement, in a user cylinder area;
2. after saving the system information, the reformat processing unit 66 erases the servo information from the servo cylinder for offtrack measurement, and writes new servo information on the basis of the servo surface without offtrack correction;
3. after writing the servo information, the reformat processing unit 66 erases the data stored in the original area, and thereafter writes the system information into the original area to restore the information; and
4. the reformat processing unit 66 then reformats the system cylinder area, except for cylinders recording the servo information and system information, and user cylinder area to place the cylinders in condition to save data.

More specifically, the reformat processing unit 66 of the disk device 14-1 records the servo information for offtrack measurement in the predetermined cylinder in an outer guard band area of a disk medium, and records the system information in another cylinder of the outer guard band area.

When the reformat control unit 72 of the array controller 10 receives a normal end of the command from the reformat processing unit 66 of the disk device 14-1, the reformat control unit 72 restores the data from the disk devices 14-2 to 14-4 to the disk device 14-1. Further, the reformat control unit 72 writes the data into the disk device 14-1, where reformatting has ended normally. Thereafter, disk device 14-1 is connected logically to the disk array 12 and becomes available for reuse. Therefore, if reformatting is successful, the disk device where the offtrack error occurred returns to be operational again without exchanging the disk device for repair.

If the array controller 10 receives a normal end of the diagnostic I/O command, the current amount of offtrack is within a measurable limit with the servo cylinder, and hence the disk device is normal. Therefore, the disk device 14-1 is connected to the disk array 12 logically to become available for reuse.

If the array controller 10 receives an abnormal end of the reformat command from the disk device 14-1, the controller determines that failure which cannot be recovered by reformatting has occurred. In this case, the controller informs the upper system of the failure information of the disk device, and executes countermeasures such as preparing the disk device to be exchanged for maintenance, and replacement by the hot spare.

In addition, the array controller 10 comprises a reformat management information memory unit 74 saving the information communicated in conjunction with the normal end of the diagnostic I/O command to the disk devices 14-1 to 14-5. When the reformat control unit 72 receives an abnormal end of the diagnostic I/O command, the reformat control unit 72 issues the format command again, in reference to the reformat management information memory unit 74.

For example, the reformat management information memory unit 74 stores time information (year, month, day, and time when reformatting was performed) of reformatting with identification information of the disk devices 14-1 to 14-5. When the reformat control unit 72 refers to the reformat management information memory unit 74, if the elapsed time from the last formatting exceeds a predetermined time, the reformat control unit 72 recognizes the necessity of reformatting, and issues a reformat command. On the other hand, if the elapsed time is within the predetermined time, the reformat control unit 72 informs the upper system of the failure information, because the possibility of recovery is very low even if the disk device is reformatted.

In addition, the reformat control unit 72 stores a frequency of reformatting with the identification information in the reformat management information memory unit 74. When the reformat control unit 72 refers to the reformat management information memory unit 74, if the frequency of reformatting is less than the predetermined number, the reformat control unit 72 may issue the reformat command. On the other hand, if the frequency reaches the predetermined frequency, the unit may inform the upper system of the failure information without issuing the reformat command.

Further, the reformat control unit 72 stores the reformat time and frequency with the identification information in the reformat management information memory unit 74. When the reformat control unit 72 refers to the reformat management information memory unit 74, if the elapsed time from the last reformatting is within the predetermined time and the frequency is less than the predetermined frequency, the reformat control unit 72 may issue the reformat command. However, if the elapsed time exceeds the predetermined time or the frequency reaches the predetermined frequency, the reformat control unit 72 may inform the upper system of the failure information without issuing the reformat command.

The reformat management information memory unit 74 is included in non-volatile memory 34. In this case, if a disk device logically disconnected from the disk array 12 is exchanged, the array controller 10 clears from the reformat management information memory 74 information stored therein of the exchanged disk device in preparation for initialization.

For this reason, although the disk device in which the offtrack error was detected is logically disconnected from the array controller 10, because the disk device is part of a disk array system, the disk array system may execute an I/O instruction received through an interface to an upper system while the disk array system logically connects through internal processing the disk device in which the offtrack error was detected again for use.

Also as shown in FIG. 1(B), offtrack information is transferred from the disk drive 14-1 to the array controller 10 through device adapter 26-1.

Figure 2:
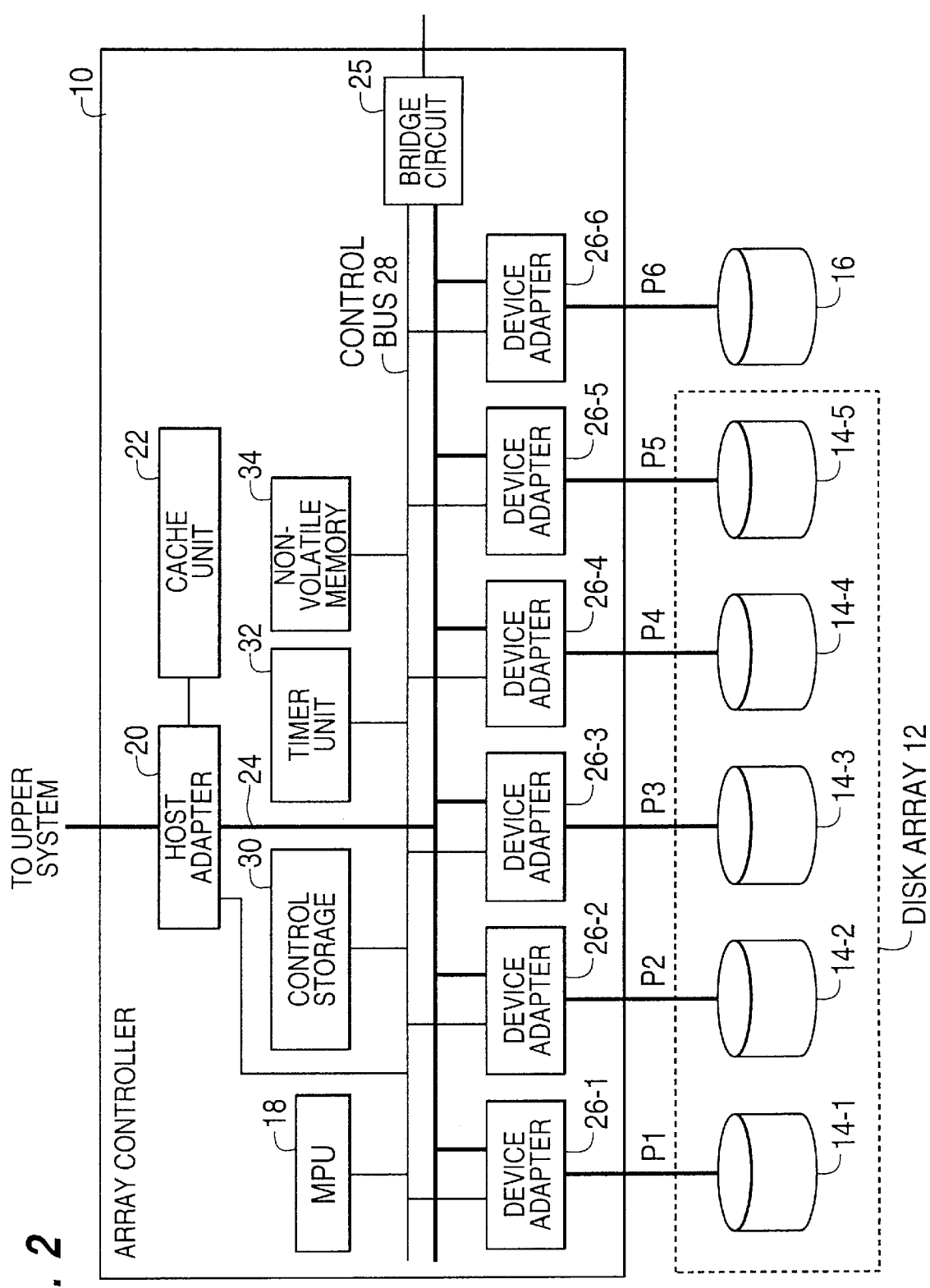
FIG. 2 is a block diagram of operation environment of the present invention.

FIG. 2 is a block diagram showing a preferred embodiment of the hardware operation environment of a disk array system according to the present invention. As shown in FIG. 2, the disk array system according to the present invention comprises an array controller 10 and a disk array 12. The disk array 12 comprises five disk drives 14-1 to 14-5 in the embodiment shown in FIG. 2.

Assuming, for example, that the disk array 12 implements RAID3, four disk drives 14-1 to 14-4 are used for data, and the fifth disk drive is used for parity data. On the other hand, if the disk array 12 implements RAID5, a disk drive is not exclusively allocated for parity data. That is, saving positions of the parity data change cyclically each time when parallel sector positions of five disk drives 14-1 to 14-5 change. Further, a hot spare 16 is provided as a reserve disk drive.

The array controller 10 comprises MPU 18. The upper interface comprises host adapter 20 interfacing to the MPU 18, and the disk array 12 comprises device adapters 26-1 to 26-6. The disk drives 14-1 to 14-5 and hot spare 16 of the disk array 12 are connected respectively to ports P1 to P6 that are device paths from the device adapters 26-1 to 26-6.

Here, the disk array 12 comprises a rank including five disk drives 14-1 to 14-5 connected to the ports P1 to P5. The foregoing rank includes a hot spare 16. A plurality of ranks of the disk arrays 12 can be provided for the array controller 10, in accordance with the present invention.

The device adapters 26-1 to 26-6 provided in the array controller 10 are connected to the host adapter 20 through a control bus 28. The host adapter 20 comprises a cache unit 22, and controls transmission of command data necessary for I/O to the upper interface.

The MPU 18 provided in the array controller 10 is connected not only to the device adapters 26-1 to 26-6 but also to the host adapter 20 through the control bus 28. The MPU 18 further connects to a control storage 30, timer unit 32, and non-volatile memory 34 through the control bus 28. The control storage 30 stores various types of control information necessary for the MPU 18 to control the disk array 12. The timer unit 32 generates time information of the array controller 10. The non-volatile memory 34 stores various types of data that should not be deleted when the power supply is turned off.

Normal processing of the array controller 10 is explained as follows. Since the host adapter 20 monitors an I/O request from the upper interface, the controller refers to the cache unit 22 using a requested logical block address if the I/O (read or write) request is issued. If this access hits the data in the cache unit, the controller passes the data to the upper interface, and if not, the controller requests the MPU 18 to access the disk array 12.

After the MPU 18 receives the access request to the disk array 12, issued from the host adapter 20, the MPU 18 recognizes the disk drives 14-1 to 14-4 for data and disk drive 14-5 for parity data. Disk drives 14-1 to 14-4 and disk drive 14-5 comprise a parity group in the disk array 12. For example, if the access request from the upper interface is a write command, the MPU 18 performs staging of the target data from the disk array 12 to the cache unit 22.

The MPU 18 refers to the control storage 30 and a mapping table stored therein that shows a corresponding relationship between a block address from the upper interface and the data distributed in the four disk drives 14-1 to 14-4 of the disk array 12. Consequently, the MPU 18 informs the device adapters 26-1 to 26-4 respectively of cylinder addresses CC, head addresses HH, and data lengths that are obtained by referring to the mapping table.

When the device adapters 26-1 to 26-4 recognize an empty path to the corresponding disk drives 14-1 to 14-4, the device adapters 26-1 to 26-4 execute data reading requested by the MPU 18. After synthesizing all of the obtained device data, the device adapters 26-1 to 26-4 transfer the data to the cache unit 22 of the host adapter 20 to overwrite the write data received from the upper system.

On the other hand, if the access requested by the upper interface is read access, the device adapters 26-1 yo 26-4 read the corresponding data from each disk device 14-1 to 14-5 of the disk array 12. After that, the device adapters 26-1 to 26-4 perform staging to the cache unit 22, and subsequently respond to the upper interface through the host adapter 20. This response after staging from the disk array 12 to the cache unit 22 is treated as hit processing with receiving the access request again from the upper interface after placing the cache unit 22 into the cache-hit state by the host adapter 20.

In addition to functioning as a conventional disk array system, the disk array system according to the present invention also detects an offtrack in the disk drives 14-1 to 14-5, and the hot spare 16, of the disk array 12. Therefore, the disk array system according to the present invention informs the array controller 10 of the offtrack after offtrack detection.

In the system shown in FIG. 2, disk drives 14-1 to 14-5 comprising the disk array 12 according to the present invention adopt respectively the servo-surface servo detecting a head position using a dedicated servo surface recording only the servo information and a dedicated servo head. The hot spare functions as described above. For this reason, a disk device records servo information for measuring offtrack errors on a specific cylinder in an outer guard band area. The cylinder for measuring offtrack is called as a servo cylinder, in the present invention.

Therefore, a disk drive 14-1 to 14-5 uses for offtrack detection the time between I/O commands from the device adapters 26-1 to 26-6 of the array controller 10. For example, in the present invention the disk drive moves a head to the cylinder for offtrack measurement at every point in time set by a timer, the cylinder being recorded in the outer guard band area of a data surface, and subsequently measures the amount of offtrack. If the measured amount of offtrack is near to, or beyond, the measurable limit depending on the servo pattern of the offtrack measurement cylinder, (i.e., if the amount of offtrack exceeds the predetermined threshold), the disk drive informs the MPU 18 of the array controller 10 of the offtrack.

When the MPU 18 of the array controller 10 receives information of the offtrack from the disk drive of the disk array 12, the MPU 18 logically disconnects the disk drive from the disk array 12. Subsequently, the MPU 18 issues a diagnostic I/O command. When the diagnostic I/O command issued from the MPU 18 is received by the disk drive, the diagnostic I/O command activates processing for measuring the offtrack.

Figure 3:
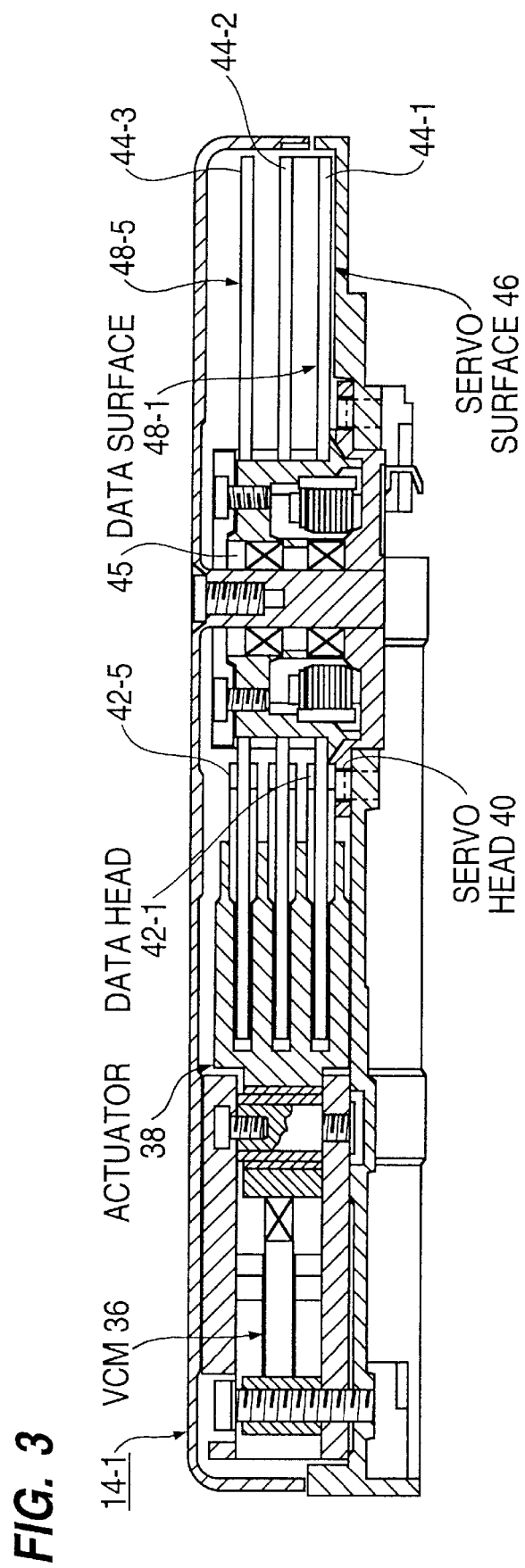
FIG. 3 is the sectional view of a disk drive shown in FIG. 2.

FIG. 3 shows the internal construction of the disk drive 14-1 shown in FIG. 2. The disk drive 14-1 comprises a rotary actuator 38 rotated with a VCM 36 inside a cover. At a point on an arm of the actuator 38, five data heads 42-1 to 42-5 (for example), corresponding to the number of surfaces, are mounted.

At the positions corresponding to the servo head 40 and data heads 42-1 to 42-5, for example, three magnetic disks 44-1 to 44-3 mounted on a rotating shaft of a spindle motor 45 are mounted, and are rotated. In the magnetic disk 44-1, the servo surface 46 is the lower surface facing the servo head 40. On the servo surface 46, servo information is recorded at all the cylinder positions, every servo frame having a predetermined length. The opposite side of the magnetic disk 44-1, and magnetic disks 44-2 and 44-3 are used as data surfaces 48-1 to 48-5.

Figure 4:
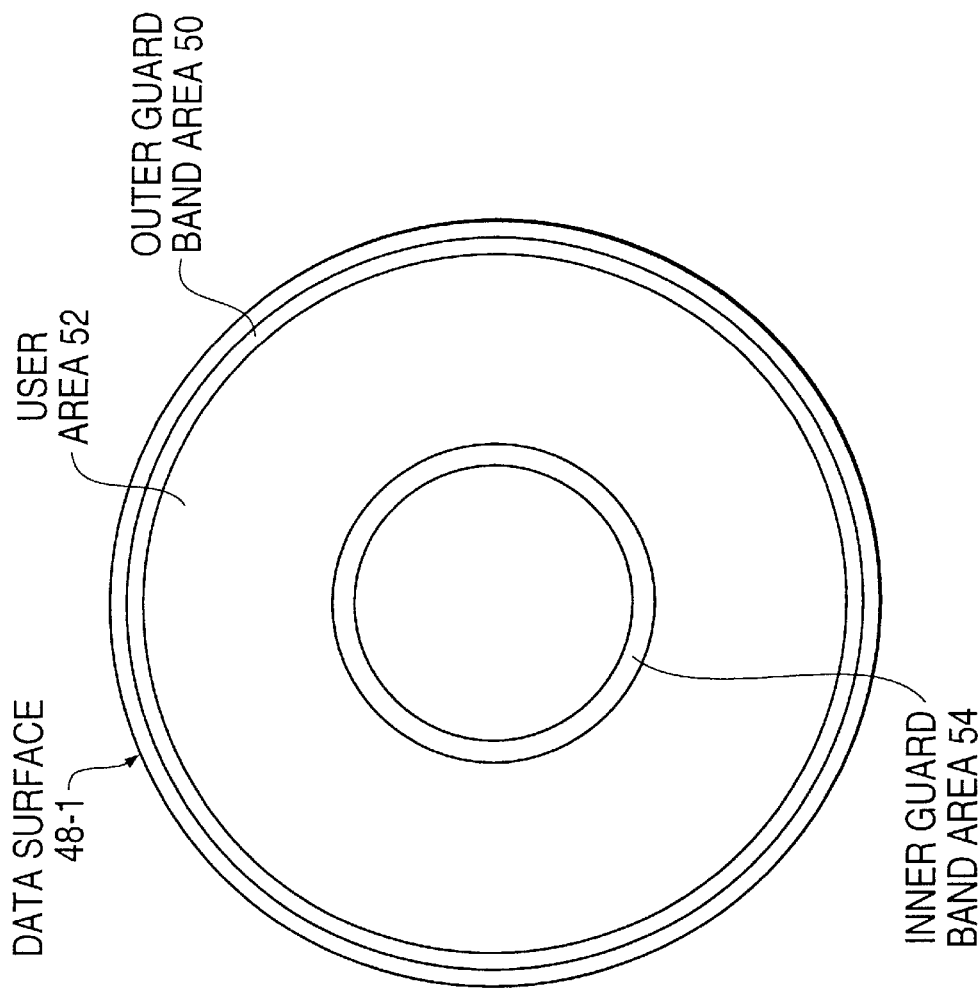
FIG. 4 is an explanatory drawing showing a data surface of a disk medium.

FIG. 4 shows the data surface 48-1 shown in FIG. 3. The data surface 48-1 comprises an outer guard band area 50 used as a system area in the outer-most circumference of a medium, a user area 52 inside the outer guard band area, and an inner guard band area 54 in the inner-most circumference. The inner guard band area 54 comprises an area for contact start or stop of the system area and head.

As shown in FIG. 4, in the outer guard band area 50, a servo cylinder is provided outside of an offtrack measurement cylinder recording the servo pattern using the data head 42-1 (shown in FIG. 3). Specifically, in a preferred embodiment, the servo cylinder is provided at a −5 cylinder position in the outer guard band area 50. In addition, both sides of cylinder positions, a −4 cylinder position and −6 cylinder position, store servo information as dummy cylinders. The outer guard band area 50, except for the −4, −5, and 6 cylinders positions, is used as a system area recording various types of system area information necessary for disk drive control. In this system area, offtrack correction values are also recorded. The offtrack correction values recorded therein are used for offtrack correction of the head and for eccentricity correction of the disk that were measured by the servo cylinder in the outer guard band area 50.

Figure 5:
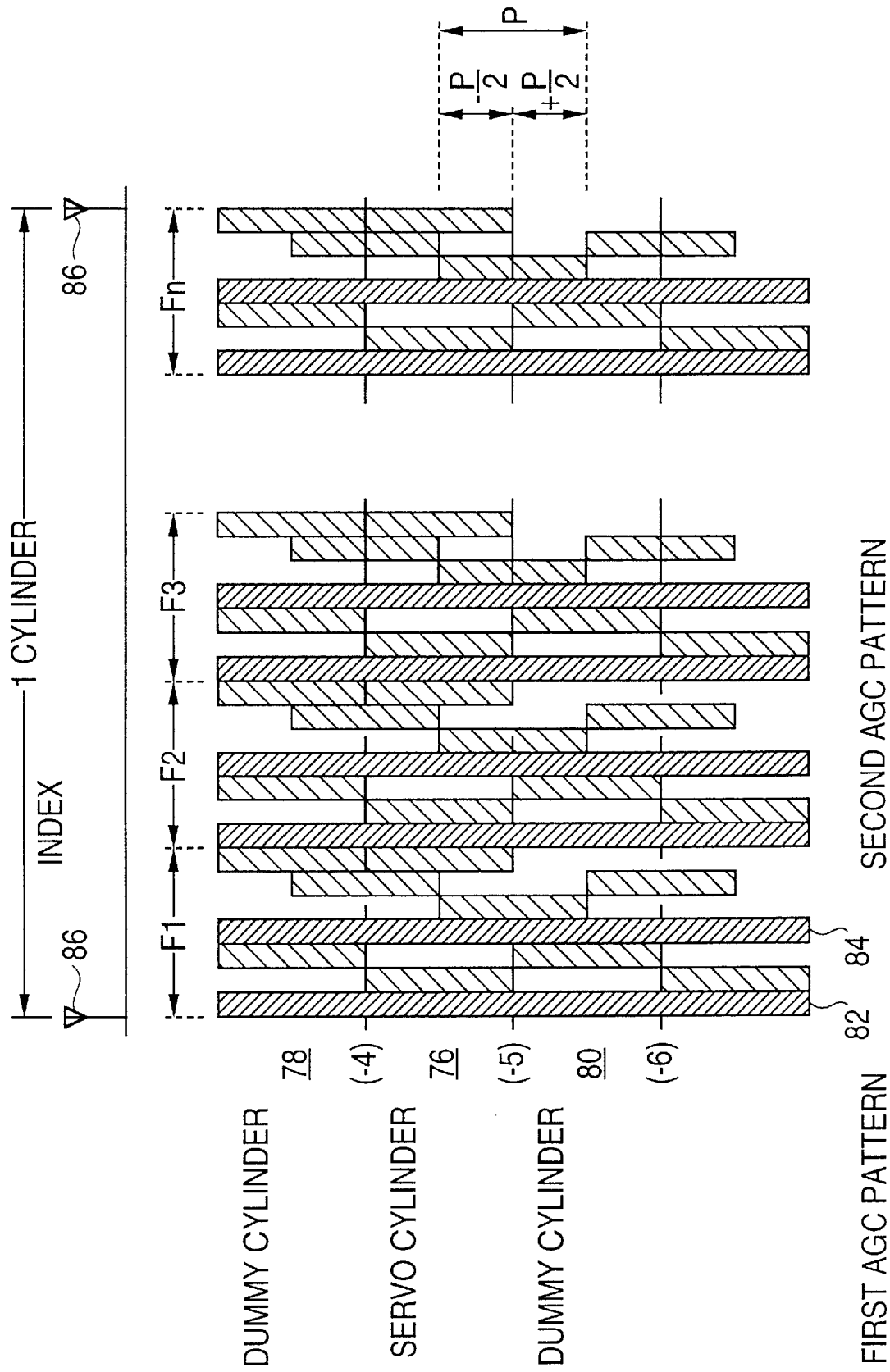
FIG. 5 is an explanatory diagram showing recorded patterns of servo cylinders on the data surface shown in FIG. 4.

FIG. 5 shows recorded patterns of the servo cylinder recorded in the outer guard band area 50 (shown in FIG. 4), which patterns are recorded in circles on the servo cylinder but which are shown linearly in FIG. 5.

In FIG. 5, the servo cylinder 76 uses the −5 cylinder position in the outer guard band area 50. Further, the −4 cylinder positions is used as a dummy cylinder 78, and the −6 cylinder position is used as a dummy cylinder 80. One cylinder is located between an index 86 and an index 85. In this embodiment, n pieces of servo frames F1 to Fn are recorded.

Each of servo frames F1 to Fn repeatedly records the same pattern. As shown in the servo frame F1 in FIG. 5, the first AGC (automatic gain control) pattern 82 is initially provided, then servo patterns A and H are provided, and subsequently servo patterns G and B are provided by shifting them by a track pitch P.

Next, and also as shown in FIG. 5, the second AGC pattern 84 is provided. Then, servo pattern C is provided symmetrically to the track center of the servo cylinder 76. Subsequently, servo patterns D and E are provided in offtrack of 0.5 track pitch, and finally, a servo pattern F is recorded between the track center of the servo cylinder 76 and a dummy cylinder 78.

These AGC patterns and servo patterns are recorded using a sufficiently high frequency with respect to a recording frequency for the data surface.

Figure 6:
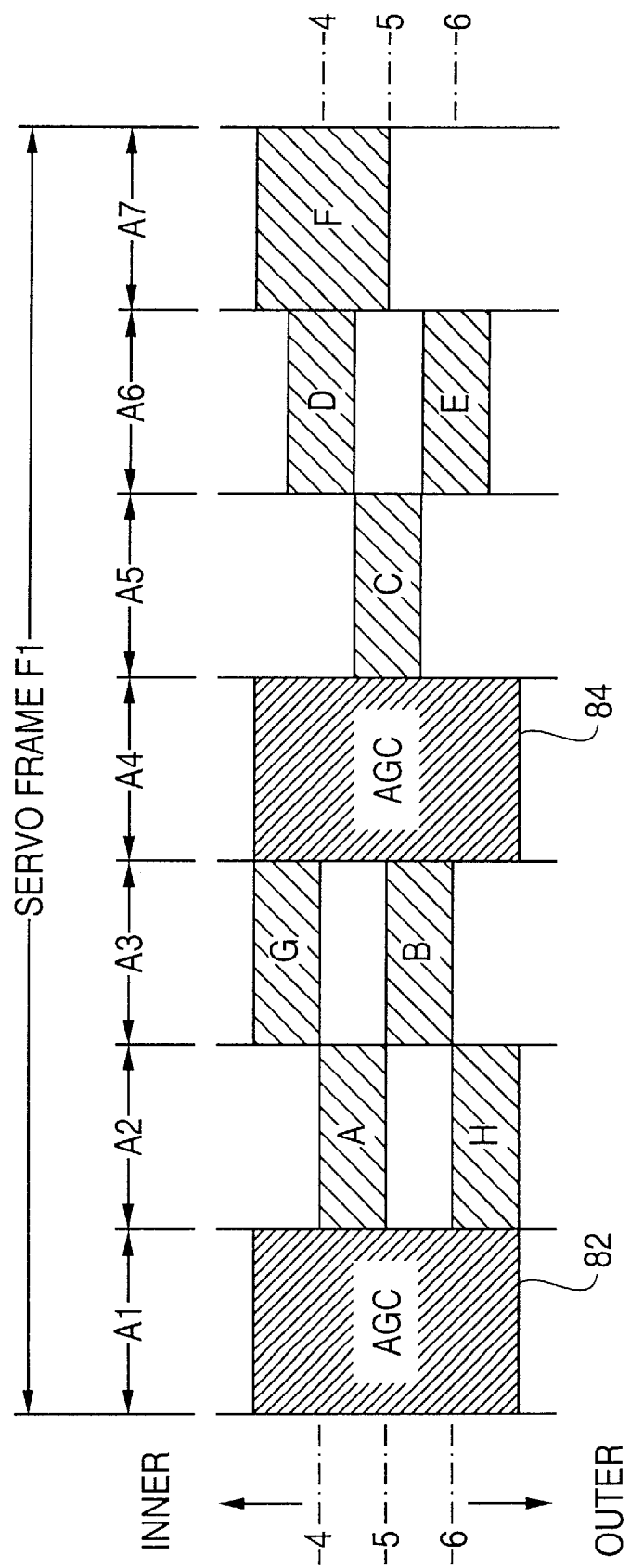
FIG. 6 is an enlarged explanatory diagram showing one servo frame shown in FIG. 5.

FIG. 6 is an enlarged, explanatory drawing of the servo frame F1 shown in FIG. 5. The servo frame F1 is divided into seven areas A1 to A7 toward a track, and servo patterns are recorded in the areas A2, A3, A5, A6, and A7. AGC areas 82 and 84 are used to generate respective target voltages of AGC for making amplitude of signals read from the servo patterns A to H constant.

Here, assuming that, as shown in FIG. 5, a track pitch of the servo cylinder 76 is P, the offtrack amount can be measured in the range of 1.25 P using this servo pattern. Accordingly, the offtrack amount can be measured in the range of ±0.625 P with respect to the track center of the servo cylinder 76.

FIGS. 7(A) to (E) show peak amplitudes of signals read from AGC patterns 82 and 84, and servo patterns A to F when a read head reads the servo frame F1 shown in FIG. 6. Therefore, regarding the signals read from servo patterns A and B in areas A2 and A3, namely, the first half of these read signals, changes of the amplitudes are shown as read signals $V_A$ and $V_B$.

FIG. 7(A) shows a case in which the head is placed at the −6 cylinder position, that is, in an outer side, where the signal $V_A$ read from the servo pattern A is small and the signal $V_B$ read from the servo pattern B is sufficiently large.

FIG. 7(B) shows a case in which the offtrack toward the outer side is small. However, the signal $V_A$ read from the servo pattern A is larger than that in FIG. 7(A), and the signal $V_B$ read from the servo pattern B is smaller than that in FIG. 7(A). The relationship between both signals is $V_A<V_B$. Hence, the offtrack toward the outer side is apparent.

FIG. 7(C) shows a case in which the head is just on the −5 cylinder position, and hence, the signals read from the servo patterns A and B are the same amplitude.

FIG. 7(D) shows a case in which the head is in the offtrack a little bit toward the inner side, that is, toward the −4 cylinder. Hence, the signal $V_A$ read from the servo pattern A is larger than the signal $V_B$ read from the servo pattern B.

FIG. 7(E) shows a case in which the head is in the offtrack greatly toward the inner side, that is, toward the −4 cylinder. Hence, the signal $V_B$ read from the servo pattern B is sufficiently small.

Further, the signals $V_F$ read from the servo pattern F in the area A7 that are obtained and shown in the last positions in FIGS. 7(A) to 7(E), become gradually larger as the offtrack position of the head goes from the outer side to the inner side. When the signal $V_F$ is obtained by reading $V_F$ from the servo pattern F, areas A2 and A3 shown in FIG. 6 are used for measurement of the offtrack using the servo patterns A and E, or A and B.

When the signal $V_B$ read from the servo pattern F cannot be obtained, then the offtrack measurement is performed with the servo patterns H and B. This is similar in areas A5 and A6. When the signal $V_F$ read from the servo pattern F is obtained, the offtrack measurement is performed with servo patterns C and D, and when the signal $V_F$ cannot be obtained, the offtrack measurement is performed with servo patterns C and E.

The procedure for measuring the offtrack in the servo cylinder using the servo frame F1 shown in FIG. 6 is described below.

Figure 8:
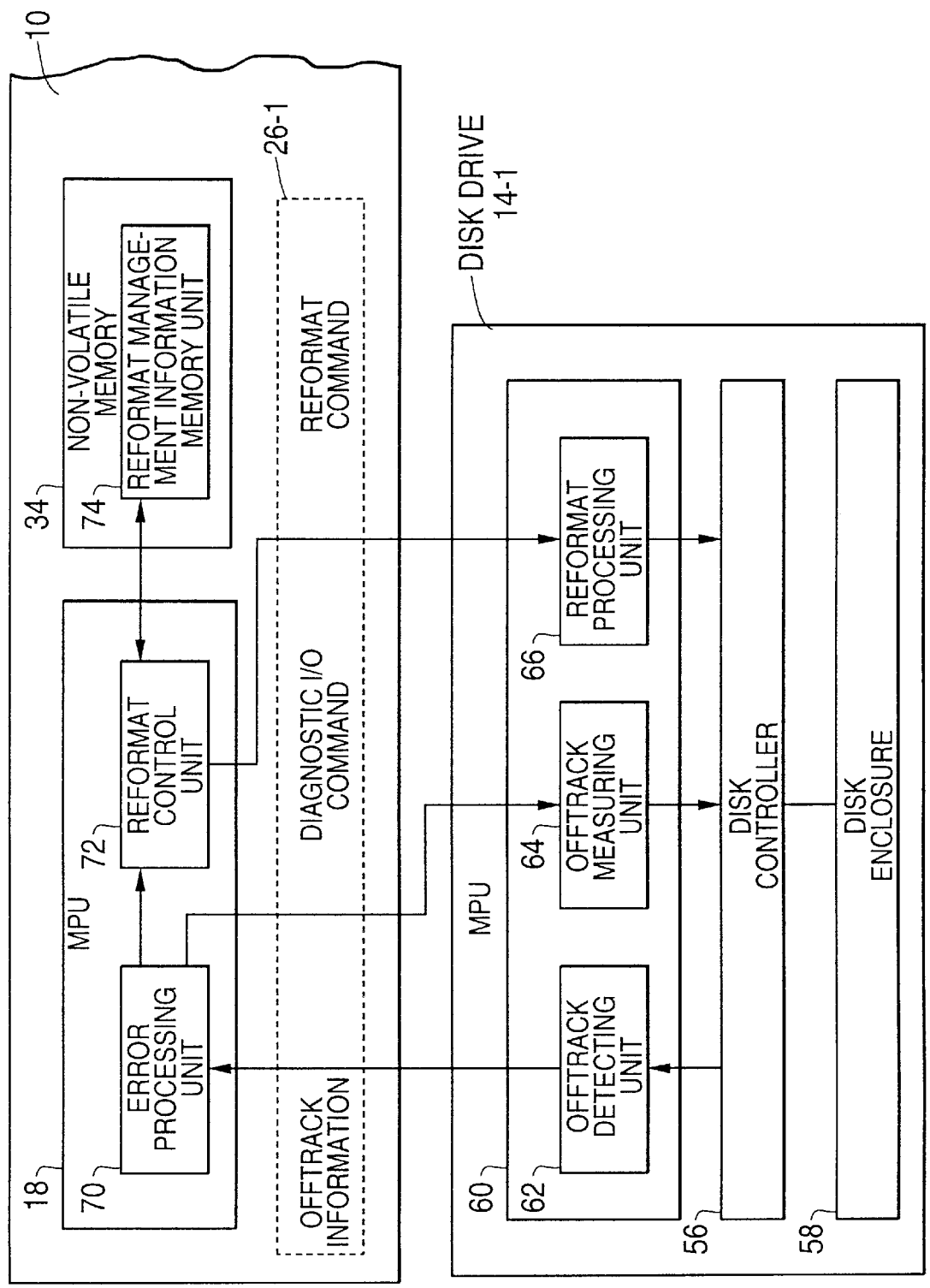
FIG. 8 is a block diagram of processing functions of the present invention.

FIG. 8 is a block diagram showing a function of control processing of the present invention applied to the disk array system shown in FIG. 2. The disk drive 14-1 included in the disk array 12 comprises a disk enclosure 58, a disk controller 56, and an MPU 60 for the disk.

The MPU 60 for the disk comprises an offtrack detecting unit 62, an offtrack measuring unit 64, and a reformat processing unit 66. The above-mentioned construction of functions in disk drive 14-1 is the same as those in other disk drives 14-2 to 14-5 and the hot spare 16.

As shown in FIG. 8, in a preferred embodiment of the present invention, array controller 10 comprises error processing unit 70 and reformat control unit 72, corresponding to the functions in the disk drive 14-1. Further, a non-volatile memory 34 comprises a reformat management information memory unit 74. Functions of the array controller 10 are achieved by the error processing unit 70 and reformat control unit 72. In addition, in another embodiment of the present invention, additional processing is performed, utilizing management information in a reformat management information memory unit 74 of the non-volatile memory 34.

The offtrack detecting unit 62 provided in the MPU 60 of the disk drive 14-1 seeks an offtrack measurement cylinder during a time when the disk drive is not being accessed (i.e., empty time), and measures an amount of the offtrack. That is, the offtrack detecting unit 62 makes the servo head 40 shown in FIG. 3 seek the −5 cylinder on the servo surface 46, which is the servo cylinder for offtrack measurement. When the offtrack detecting unit 62 recognizes that the amount of the offtrack exceeds a predetermined threshold and is near to the measurable limit of the offtrack, the offtrack detecting unit 62 transmits the offtrack information to the error processing unit 70 provided in the MPU 18.

At this point, the measurable range with the servo cylinder recorded on the data surface 48-1 exceeds, for example, ±P/2 from the track center of the servo cylinder 76 shown in FIG. 5. Hence, the measurable range is, for example, up to ±0.625 P. Therefore, the offtrack detecting unit 62 detects the offtrack through setting the threshold at ±0.5 P.

Control processing of the array controller 10 is explained with reference to FIGS. 8, 9, and 10.

Figure 9:
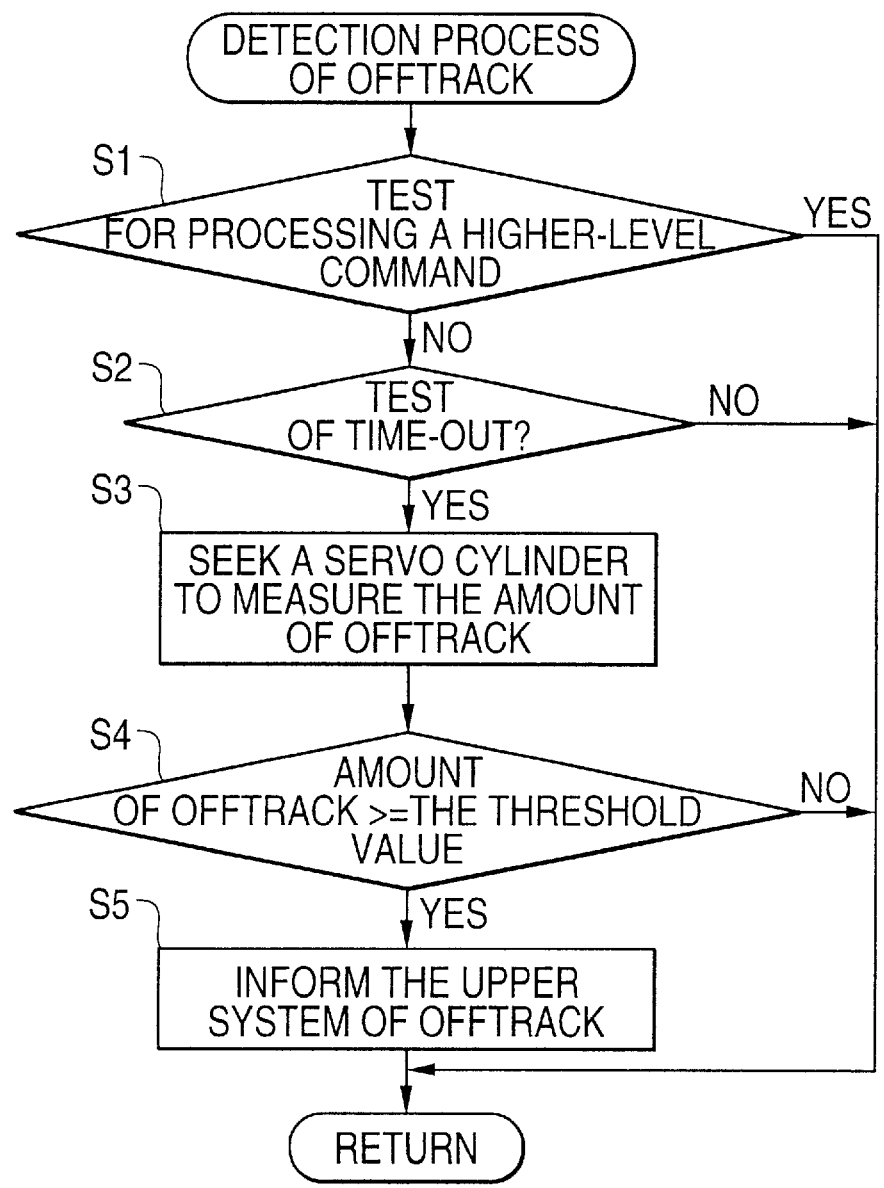
FIG. 9 is a flow chart of detection processing in the offtrack detecting unit shown in FIG. 8.

FIG. 9 is a flow chart showing detection processing of the offtrack detecting unit 62. First, if the offtrack detecting unit 62 discriminates at step S1 that a higher-level command is not being executed, the process proceeds to step S2 to test the time-out status of a timer setting a detection period for detecting the offtrack. In a preferred embodiment of the present invention, this timer is set, for example, in a 24-hour mode, and is set at midnight when the system is unoccupied.

If the offtrack detecting unit 62 discriminates the time-out at step S2, then the offtrack detecting unit 62 seeks the servo cylinder on the data surface at step S3 to measure the amount of the offtrack. This measurement of the offtrack is performed for all the data surfaces by switching heads. Next, at step S4, the offtrack detecting unit 62 decides whether the measured amount of the offtrack exceeds the predetermined threshold, which means the amount is near to the measurable limit of the offtrack. If the amount is greater than or equal to the threshold amount of the offtrack, the process proceeds to step S5 to inform the upper system, array controller 10, of the offtrack information.

Although the amounts of the offtrack measured here are different for each data surface, the offtrack detecting unit 62 informs the upper system of the offtrack if only one of amounts of the off track exceeds the threshold.

Also in reference to FIG. 8, when the offtrack detecting unit 62 of disk drive 14-1 informs the upper system of the offtrack, the error processing unit 70 logically disconnects the disk drive 14-1 of the disk array 12, after having communicated the offtrack, from the object disk drives of the disk array 12 if the error processing unit 70 is executing an access request received through the upper interface.

Accordingly, the array controller 10 shown in FIG. 8 processes the access request received through the upper interface using normal disk drives 14-2 to 14-5, without the one disk drive logically disconnect as above. In this case, without the disk drive 14-1, the array controller 10 restores the data or parity data of the disk drive 14-1, which are separated from the data and parity data of the residual disk drives 14-2 to 14-5. The array controller 10 can respond to the access request received through the upper interface using the restored data.

The response performance of the disk array 12 shown in FIG. 8 decreases because of the necessity of restoring the data of the disconnected disk drive 14-1. However, access of the disk array 12 by the array controller 10 is not prevented.

The error processing unit 70, shown in FIG. 8, receives the offtrack information from the offtrack detecting unit 62 of the disk drive 14-1, and issues a diagnostic I/O command to the offtrack measuring unit 64 of the disk drive 14-1 to confirm the cause of the offtrack.

The offtrack measuring unit 64, shown in FIG. 8, receives the diagnostic I/O command, and makes the servo head shown in FIG. 3 seek the −5 cylinder on the servo surface, which is the target cylinder for offtrack measurement. After the subject seeking, which is based on the read signal of the servo frame on the data surface 48-1 (shown in FIGS. 3 and 4) read with the data head for the data surface in the head switching state which caused the offtrack, for example, the data head 42-1 shown in FIG. 3, the offtrack measuring unit 64 measures the offtrack of the −5 cylinder on the data surface using the −5 cylinder on the servo surface as a reference.

At this point, the measurable range with the servo cylinder recorded on the data surface 48-1 exceeds, for example, ±P/2 from the track center of the servo cylinder 76 shown in FIG. 5, and hence, the measurable range is, for example, up to ±0.625 P. However, if the value measured by the offtrack measuring unit 64 exceeds the measurable range of the servo cylinder, the offtrack measuring unit 64 informs the error processing unit 70 of abnormal end because measuring the offtrack with the present servo cylinder is not possible due to an excessively large error. In addition, this measurement of the offtrack is performed for all the data surfaces by switching heads.

The error processing unit 70, shown in FIG. 8, receives the abnormal end corresponding to the diagnostic I/O command from the disk drive 14-1, activates the reformat control unit 72 to issue a reformat command, that is, a field reformat command, to the reformat processing unit 66 of the disk drive 14-1.

The reformat processing unit 66 of the disk drive 14-1, shown in FIG. 8, receives the reformat command, and erases the servo information shown in FIG. 5 and recorded in the −5 cylinder of the outer guard band area 50 shown in FIG. 4. Subsequently, the reformat processing unit 66, as shown in FIG. 5, rewrites the servo information in the servo cylinder 76 (the −5 cylinder) and dummy cylinders 78 and 80 (−4 and −6 cylinders) by making a correction amount of zero offtrack to use the position of the servo head against the servo surface as a reference.

At the time of this rewriting of the servo cylinder, that is, reformatting, erasing of the outer guard band area 50 occurs. Hence, the system information recorded in the area is also deleted. Then, the system information recorded in the outer guard band area 50 is saved in a predetermined cylinder in the user area 52 before re-formatting. Then, the reformat processing unit 66 erases the servo cylinder and dummy cylinders, and subsequently rewrites the servo information.

After rewriting the servo information, the reformat processing unit 66 rewrites the servo information saved in the user area 52 in the outer guard band area 50 as a restoring process. Finally, for the system area except the servo information and system information last written in the outer guard band area 50 (shown in FIG. 4), the user area, and an inner guard band area 54 (shown in FIG. 4), reformatting is performed to make the sector format capable of recording data.

After completion of rewriting the servo cylinder on the data surface by the reformat processing unit 66, the offtrack of the data head for the data surface to the servo head for the servo surface is zero at that point in time. Therefore, using the offtrack measuring unit 64 again, the offtrack measurement is performed for the servo cylinder on the data surface using the servo surface as a reference. Consequently, the measured amount of the offtrack is recorded in the system area as the offtrack correction value for correction of the offtrack and other eccentricity.

Simultaneously, the offtrack correction value newly-obtained in the reformatting process is stored in the disk controller 56 in place of the measured offtrack value presently stored therein, and becomes the new value that will be used from this point.

Therefore, as shown in FIG. 8, if the offtrack processing is performed by issuing the diagnostic I/O command from the error processing unit 70 to the offtrack measuring unit 64 and the measured value is within the measurable limit of the offtrack in the servo cylinder, no problems are caused in the servo cylinder. Therefore, the offtrack detecting unit 62 informs the error processing unit 70 of a normal end.

The error processing unit 70 (shown in FIG. 8) receiving the normal end of the diagnostic I/O command logically connects the disk drive 14-1 into the disk array 12 again since the servo cylinder for detecting the offtrack does not report a problem. Further, the error processing unit 70 restores the data, which was updated when the disk drive 14-1 was disconnected and is recorded in the control storage 30, to return to the usual operation mode.

In addition, if processing fails due to an error in reformatting the data surface by the reformat processing unit 66 in the disk drive 14-1, the error processing unit 70 informs the array controller 10 of an abnormal end. Further, the array controller 10 transmits to the upper interface failure information. In this case, since recovery by reformatting cannot be done, exchange processing of the failed disk drive 14-1 or switching to the hot spare 16 by system engineers is performed.

Figure 10:
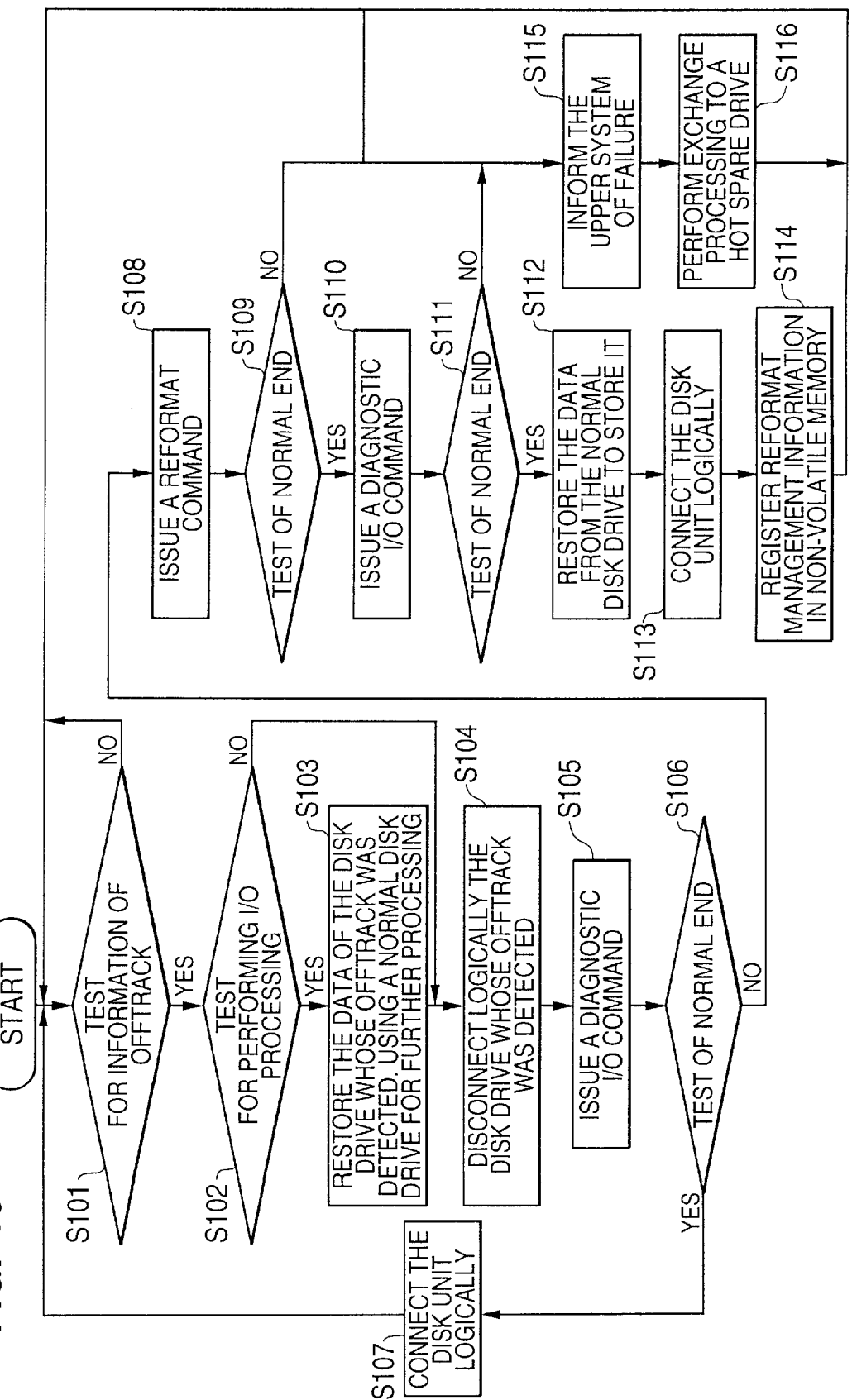
FIG. 10 is a flow chart of control processing in the array controller shown in FIG. 8.

FIG. 10 is a flow chart showing control processing of reformatting based on the offtrack information by the MPU 18 included in the array controller 10 shown in FIG. 8.

In FIG. 10, at step S101, whether the offtrack is communicated from any of disk drives 14-1 to 14-5 provided in the disk array 12 is determined. If the offtrack is communicated, at step S102, whether the array controller 10 is performing I/O processing requested through the upper interface is determined. If the array controller 10 is under processing, the process proceeds to step S103, and using a normal disk drive, the array controller 10 restores the data of the disk drive (for example, 14-1) having informed the array controller 10 of the offtrack to process the I/O request from the upper interface.

In this case, if the disk drive (for example, 14-1) having informed the array controller 10 of the offtrack stores a part of the data, the array controller 10 restores the data of the disk drive having informed the array controller 10 of the offtrack. In addition, if the disk drive having informed the array controller 10 of the offtrack stores parity data, the array controller 10 does not restore the parity data because the parity data is not necessary for I/O processing.

Next, at step S104, the array controller 10 logically disconnects the disk drive which communicated the offtrack. For this reason, the array controller 10 does not process the I/O request received from the upper interface from this point, but the array controller 10 restores the data for further processing from the residual disk drives, except from the disk drive having communicated the offtrack. Subsequently, at step S105, the array controller 10 issues the diagnostic I/O command for the offtrack measurement to the disk drive having communicated the offtrack.

In the disk drive that received the diagnostic I/O command, as explained herein in more detail, the offtrack measurement processing is performed. If the measured amount of the offtrack is within the measurable limit of the offtrack, the disk drive sends the normal end, and if not, the disk drive sends the abnormal end.

Then, at step S106, whether the information from the disk drive is the normal end is determined.

If the information is the normal end, the process returns to step S107 because the offtrack does not occur, the amount of the offtrack not exceeding the measurable limit of the servo cylinder on the data surface of the disk drive having communicated the offtrack. That is, the array controller 10 logically connects to the disk array the disk drive, which communicated the offtrack and was logically disconnected, to restore the processing in the usual I/O processing. At this time, for the I/O request that was performed when the disk drive was logically disconnected, the array controller 10 recognizes the process contents by referring to the control storage 30, etc. Further, after the array controller 10 restores the data which the array controller 10 assigned in updating the data by I/O processing that has occurred during the disconnection period, the process continues normally.

On the other hand, if the abnormal end is transmitted by the disk drive at step S106, the process proceeds to step S108 to issue the reformat command. The disk drive (for example, 14-1) receiving the reformat command rewrites the servo cylinder on the data surface, and, if the processing ends normally, the disk drive sends the normal end. In addition, if the processing of the reformat command abnormally ends, the disk drive sends the abnormal end.

If the response to the reformat command sent from the disk drive is the normal end at step S109, the process proceeds to step S110 to issue the diagnostic I/O command again for measurement of the offtrack. By measuring the amount of the offtrack through issuing the diagnostic I/O command, the disk drive (for example, 14-1) measures the actual amount of the offtrack of the reformatted servo cylinder on the data surface and confirms that the amount of the offtrack does not exceed the measurable limit.

When the array controller 10 determines at step S111 that the disk drive informed the array controller 10 of the normal end of the diagnostic I/O command, the cause of the offtrack is dissolved (or overcome). The reason is that the position of the servo cylinder on the data surface in the disk drive, which caused the offtrack, is replaced to that of the servo cylinder corresponding to the offtrack of the data head against the current servo head. Hence, the current amount of the offtrack is within the measurable limit of the offtrack.

Then, at step S112, the array controller 10 restores the data of the disk drive, which was reformatted, from the normal disk drives comprising the disk array, and saves the data in the reformatted disk drive. After saving this restored data, at step S113, the array controller 10 logically connects the disk drive which communicated the offtrack to the disk array 12 to return to the usual I/O processing.

Further, at step S114, the array controller 10 registers time information of reformatting, i.e., date and time, and the frequency of reformatting in the reformat management information memory unit 74 provided in the nonvolatile memory 34, as reformat management information. The information from the timer unit 32 shown in FIG. 2 is used for the time information in this case.

On the other hand, if the disk drive informs the array controller 10 of the abnormal end of the reformat command at step S108, the process proceeds from step S109 to step S115, the array controller 10 transmits to the upper interface the failure information of the disk drive, and, for example, at step S116, the array controller 10 performs exchange processing to the hot spare 16 provided as a reserve disk drive.

In addition, and similarly, if the disk drive informs the array controller 10 of the abnormal end of the reformat command at step S110, the array controller 10 transmits to the upper interface the failure information of the disk drive, and, at step S116, the array controller 10 performs exchange processing to the hot spare 16.

Figure 11:
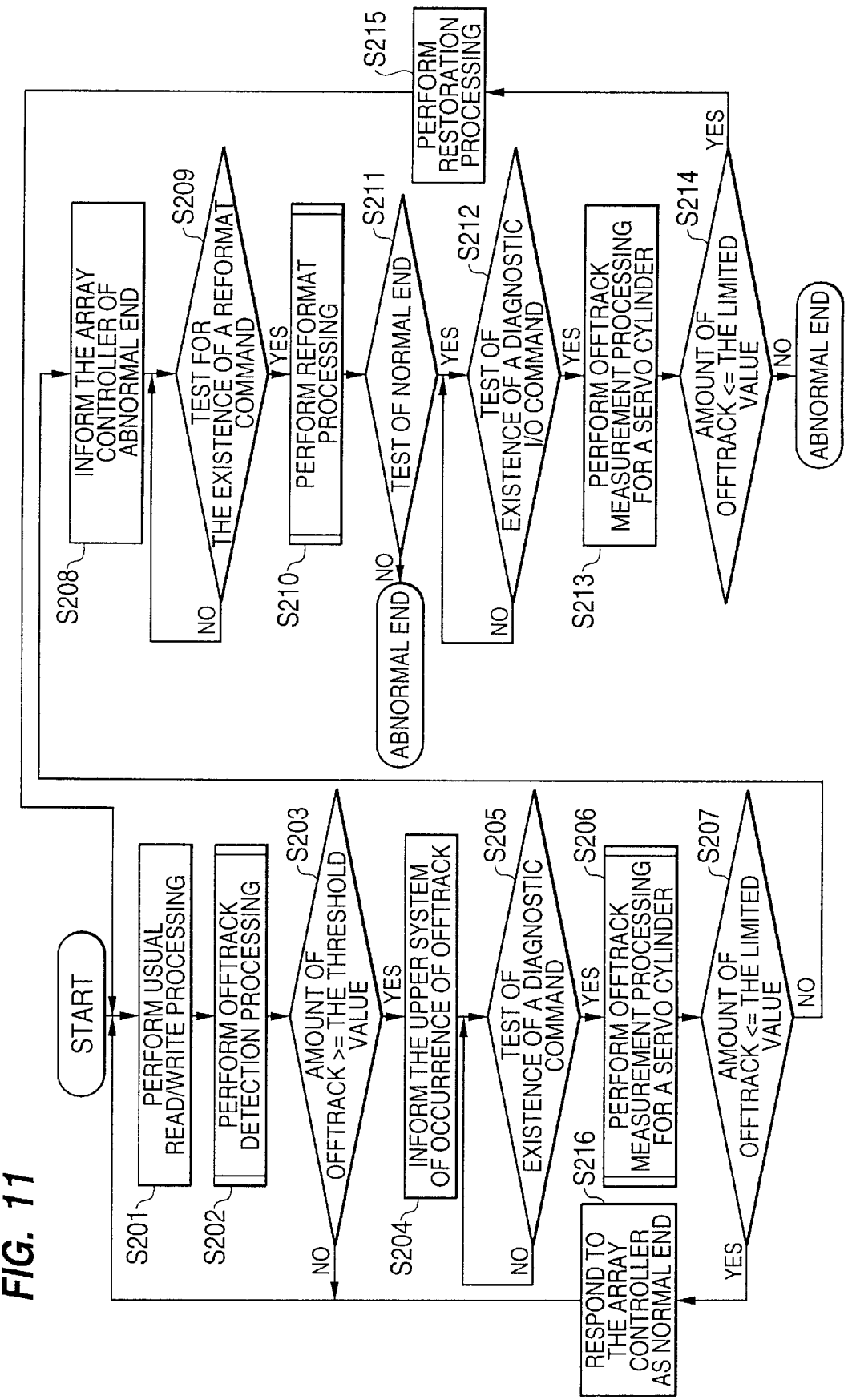
FIG. 11 is a flow chart of control processing in the disk drive shown in FIG. 8.

FIG. 11 is a flow chart of control processing of the disk drive 14-1 that was detected to have the offtrack and is provided in the disk array 12. This processing corresponds to the command issued by the array controller 10 shown in FIG. 10.

In FIG. 11, usual read or write processing is performed at step S201. Next, at step S202, a disk drive (for example, 14-1) performs offtrack detection processing. The details of offtrack detection processing are described at steps S1 to S3 shown in FIG. 9. The disk drive tests whether the amount of the offtrack measured at step S203 is greater than or equal to the threshold. If the amount of the offtrack is greater than or to the threshold, at step S204, the disk drive informs the array controller 10 of occurrence of the offtrack.

Since the array controller 10 issues the diagnostic I/O command in correspondence to this offtrack information, the disk drive determines this at step S205. After that, the process proceeds to step S206 to perform the offtrack measurement processing of the servo cylinder. After obtaining the measurement result of offtrack measurement processing of the servo cylinder, at step S207, the disk drive determines whether the resultant value exceeds the predetermined measurable limit of the offtrack of the servo cylinder, for example, ±0.625 P against the track center of the servo cylinder, the −5 cylinder.

If the resultant value is within the measurable value of the offtrack, the disk drive transmits to the array controller 10 the normal end at step S216. If the resultant value exceeds the measurable limit value, the disk drive informs the array controller 10 of the abnormal end at step S208. In response to receipt of the information of the abnormal end, the array controller 10 issues the reformat command. Therefore, after the disk drive determines this at step S209, the disk drive performs the reformat processing at step S210 to rewrite the servo cylinder on the data surface.

At step S211, the disk drive determines the normal end of the reformat processing, and subsequently, the disk drive transmits to the array controller 10 the normal end. Correspondingly, the array controller 10 issues the diagnostic I/O command.

At step S212, the disk drive determines the diagnostic I/O command has been issued, and performs the offtrack measurement processing of the servo cylinder again at step S213.

For the process result of the offtrack measurement processing of the servo cylinder after the reformat processing, the disk drive tests whether the resultant value is within the measurable limit of the offtrack. If it is within the measurable limit, the disk drive transmits to the array controller 10 the normal end and awaits information regarding the restored data from the array controller 10 to perform restoration processing at step S215.

On the other hand, if, at step S211, the reformat processing abnormally ends, or if, at step S214, the value of the offtrack measured after reformatting exceeds the measurable limit of the offtrack, the disk drive informs the array controller 10 of the abnormal end. Hence, the process ends abnormally.

Figure 12:
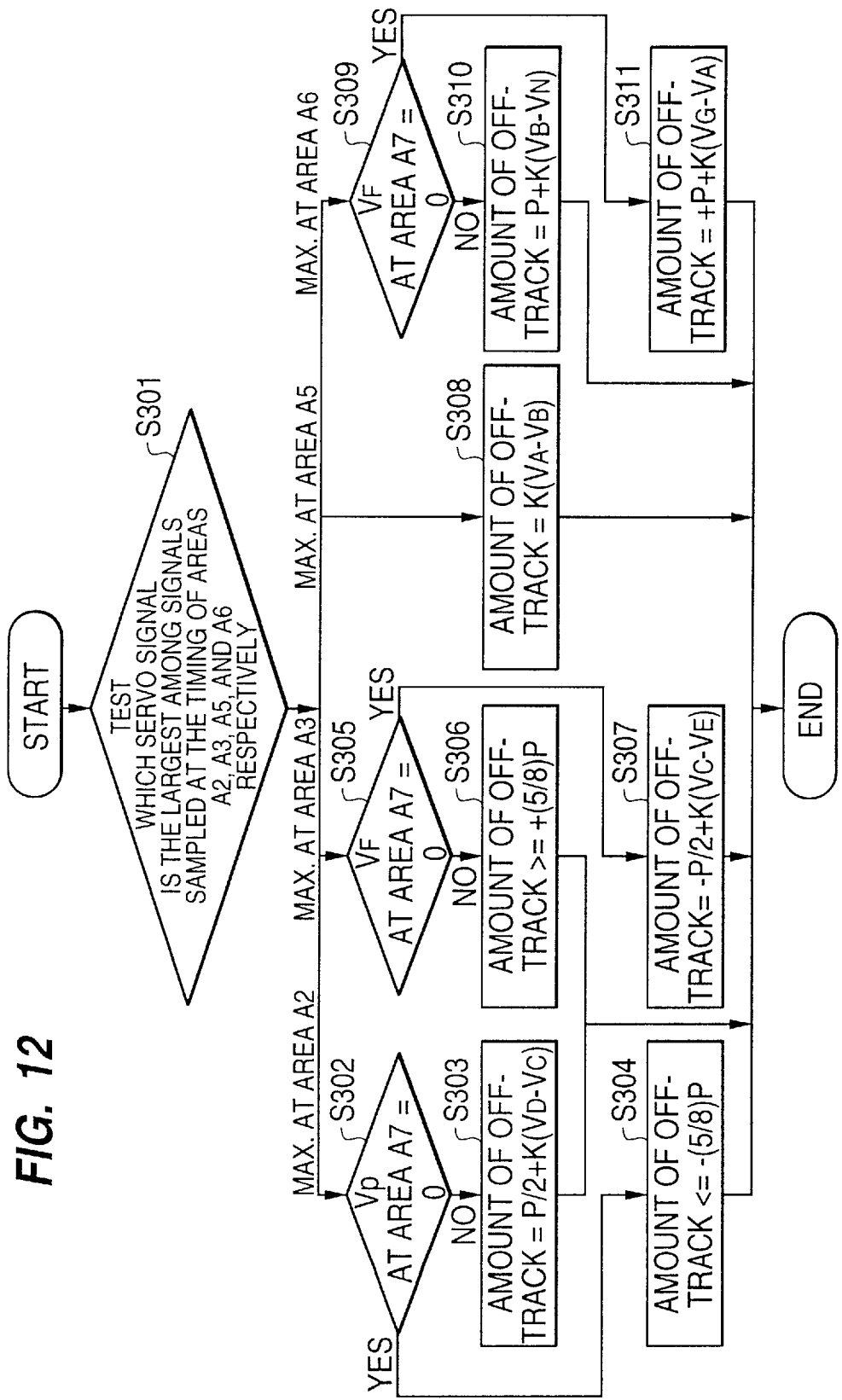
FIG. 12 is a flow chart of reformat processing in the disk drive shown in FIG. 8.

FIG. 12 is a flow chart showing measurement processing of the offtrack of the servo cylinder that is performed at step S3 in FIG. 9 and at steps S206 and S213 in FIG. 11. The measurement processing of the offtrack shown in FIG. 12 is performed by moving the servo head and data head to the servo cylinder, −5 cylinder, in the outer guard band area on the data surface shown in FIG. 5, for seeking.

Servo frames F1 to Fn in the servo cylinder 76 (shown in FIG. 5), as in the servo frame F1 shown in FIG. 6, records servo patterns A to F in areas A2, A3, A5, A6, and A7. In the measurement processing of the offtrack, the measurement processing shown in FIG. 12 is performed by holding the peak values of a servo signal read by the data head that is just on the servo cylinder. The peak values are read with using an A/D (analog-to-digital) converter (not shown).

First, at step S301, the disk drive (for example, 14-1) tests which servo signal is the largest among those sampled in the timing of areas A2, A3, A5, and A6. Assume that the servo signal in the area A2 is the largest, namely, either of the servo signal $V_A$ from the pattern A in the area A2 or the servo signal $V_H$ from the pattern H is the largest. The process proceeds to step S302, where the disk drive tests whether the servo pattern $V_F$ from the pattern F in the area A7 is zero.

If the servo signal $V_F$ is not zero, the servo head is positioned on a part of the pattern A in the area A2, and in this case, the process goes to step S303. In step S303, the disk drive calculates the amount of the offtrack with the following formula using the servo signals $V_C$ and $V_D$ from the patterns C and D in the areas A5 and A6. Here, P is a track pitch, and K is position sensitivity.

$$\text{Amount of Offtrack}=P/2+K(V_D-V_C)$$

On the other hand, if the servo signal $V_F$ is zero at step S302, the head shifts toward the pattern H in the area A2. Hence, the process proceeds to step S304. Therefore, the amount of the offtrack is within the measurable limit of the offtrack, that is, −(5/8)P, equal to −0.625 P, which means the head shifts toward the outer side.

Next, if the servo signal in the area A3 is the largest at step S301, namely, if either of the servo signals $V_G$ and $V_B$ from the patterns G and B in the area A3 is the largest, the process proceeds to step S305 to test whether the servo signal $V_F$ from the pattern F in the area A is zero. If the servo signal $V_F$ is zero, the head is on the pattern G in the area A3, and hence, the process proceeds to step S306. In step S306, the amount of the offtrack is measured and determined to be greater than or equal to +(5/8)P, that is, +0.625 P, which means the head shifts toward the inner side.

If $V_F$ is zero at step S305, the head is on the pattern B in the area A3, and hence, the process proceeds to step S307. In step S307, using the servo signals $V_C$ and $V_E$ from the patterns C and E in the areas A5 and A6, the amount of the offtrack is obtained as follows:

$$\text{Amount of offtrack}=-(P/2)+K(V_C-V_E).$$

If the servo signal $V_C$ from the pattern C in the area A5 is the largest at step S301, the process goes to step S308, where, using the Servo signals $V_A$ and $V_B$ from patterns A and B Ln the areas A2 and A3, the amount of the offtrack is obtained as follows:

$$\text{Amount of offtrack-}K(V_A-V_B).$$

If the servo signal in the area A6 is the largest, i.e., either of the servo signals $V_D$ and $V_E$, is the largest, the disk drive tests whether the servo signal $V_F$ from the pattern in the area A7 is zero. If $V_F$ is not zero, the head is in the pattern E side, and hence, the process proceeds to step S310. In step S310, using the servo signals $V_H$ and $V_B$, the amount of the offtrack is obtained as follows:

$$\text{Amount of offtrack-}P+K(V_B-V_H).$$

If the servo signal $V_F$ is zero at step S309, the head is in this pattern D side in the area A6, and hence, the process proceeds to step S311, where the amount of the offtrack is obtained as follows:

Amount of offtrack=$-P+K(V_G-V_A)$.

As is apparent in the offtrack measurement processing shown in FIG. 12, in either case of the measurement results at steps S304 and S306, the amount of the offtrack exceeds the measurable limit of the offtrack of the servo cylinder. On the other hand, in any of steps S303, S307, S308, S310, or S311, the offtrack is within the normal measurable range, that is, within the measurable limit of the offtrack with the servo cylinder.

Figure 13:
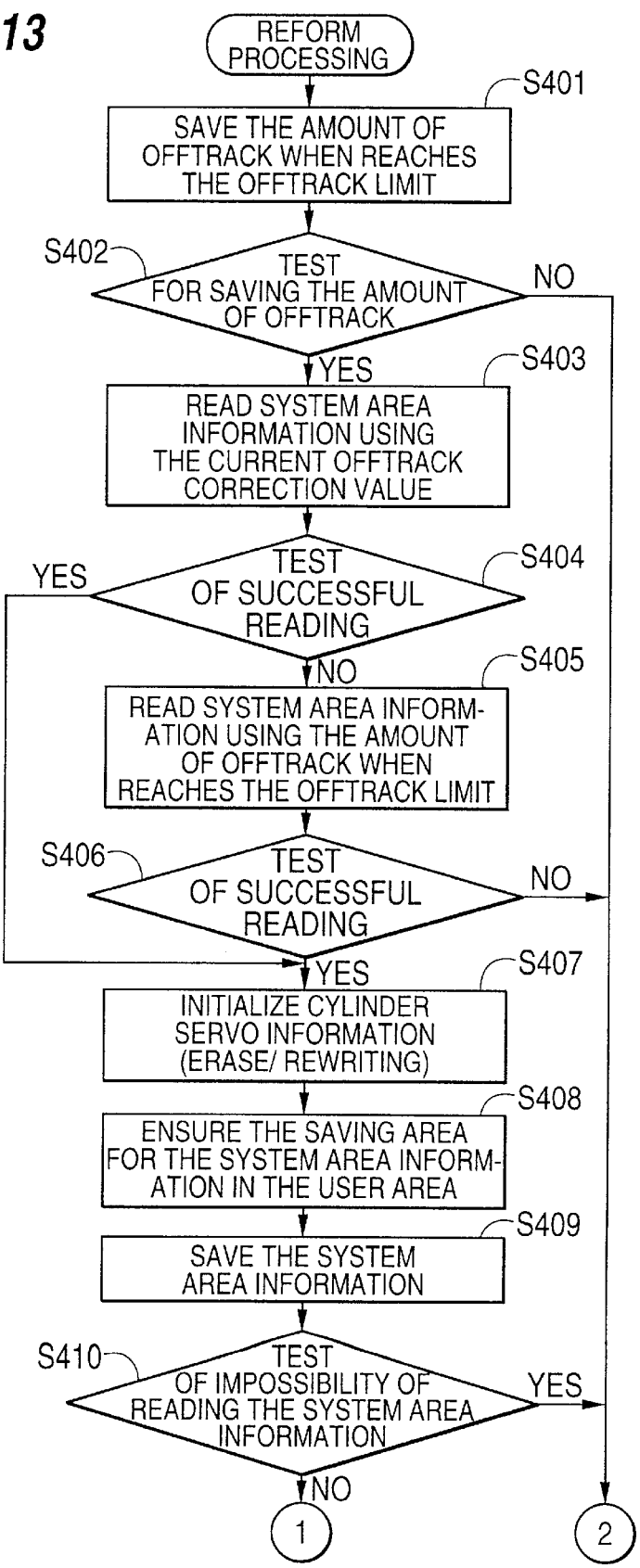
FIG. 13 is a flow chart (continued) of reformat processing in the disk drive shown in FIG. 8.
Figure 14:
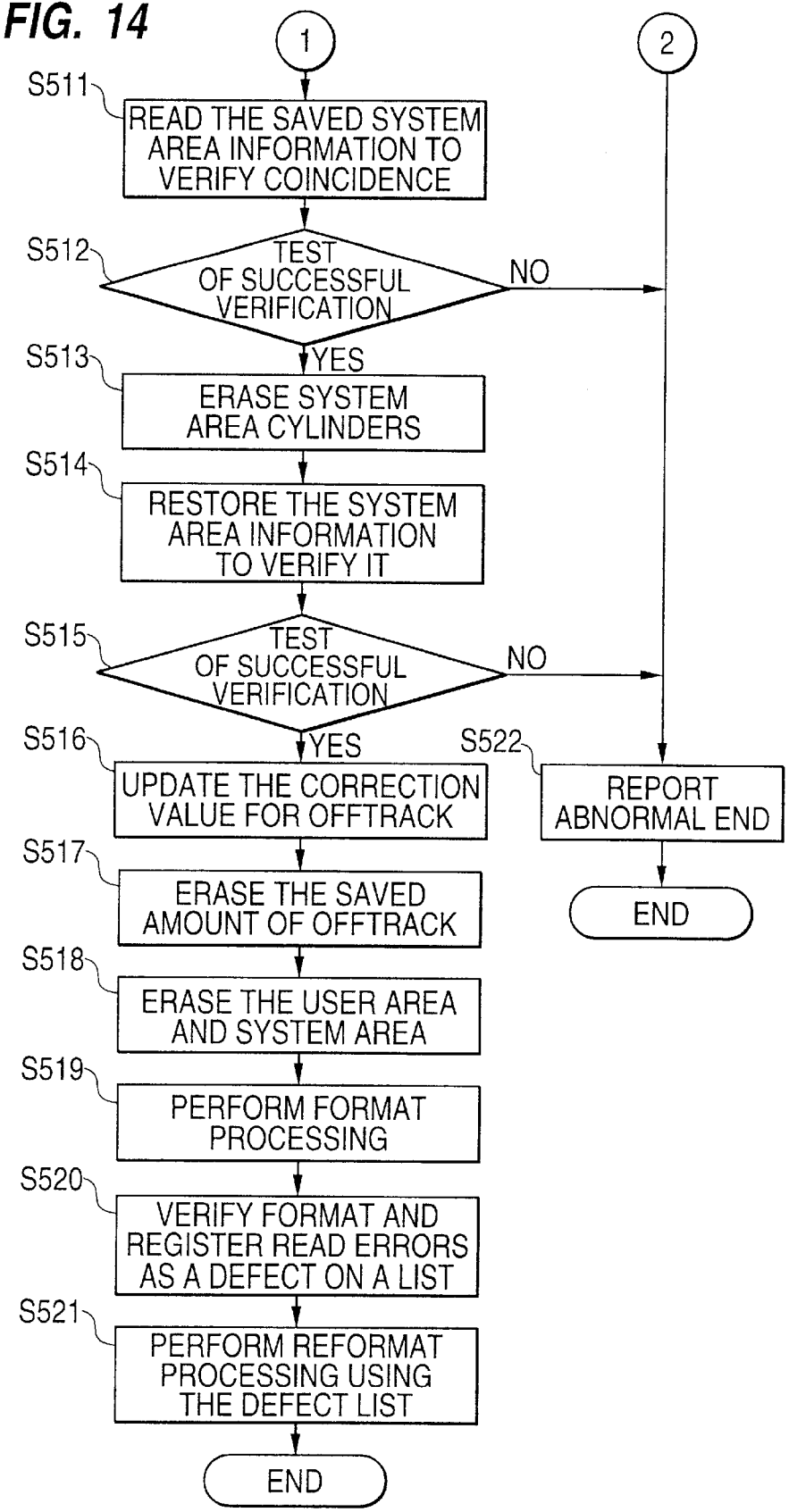
FIG. 14 is a flow chart of offtrack measurement processing in the disk drive shown in FIG. 8.

Next, referring to the flow charts shown in FIGS. 13 and 14, reformat processing in a disk drive shown at step S210 in FIG. 11 is described.

This reformat processing is divided into the following five processes:

(1) Saving and confirmation of offtrack information
(2) Reading and verification of system area information
(3) Initialization of servo cylinder information
(4) Saving and restoring of system area information
(5) Format processing and defect search.

As shown in FIG. 13, at step S401, the disk drive (for example, 14-1) saves the offtrack information based on reception of the reformat command when the amount of the offtrack nears the measurable limit of the offtrack. At least two offtrack correction values are saved as the offtrack information to be saved. The values of the at least two offtrack correction values are an existing offtrack correction value OFT1, which was measured in calibration, and an offtrack correction value OFT2, which was detected in the offtrack detection processing shown in FIG. 9 when the amount of the offtrack neared the measurable limit of the offtrack.

Subsequently at step S402, the disk drive confirms whether saving of the offtrack information is completed. If it was not, the process proceeds to step S522 shown in FIG. 14, where the disk drive reports to the array controller 10 the abnormal end.

Next, at steps S403 to S406, the disk drive reads and verifies the system area information. First, at step S403, the disk drive reads the system area information recorded in the system area cylinder on the data surface using the current offtrack correction value. If the disk drive cannot read the information at step S404, the process proceeds to step S405, where the disk drive reads the system area information in the same system area cylinder using the offtrack correction value OFT2 detected when the amount of the offtrack neared the measurable limit of the offtrack.

If the disk drive can read the system area information at either of steps S403 and S405, the process proceeds to step S407, an initialization process step for servo cylinder information. If the disk drive cannot read the system area information at step S406, the process proceeds to step S522 of FIG. 14, where the disk drive reports the abnormal end to the array controller 10.

At step S407, the disk drive initializes the servo cylinder information on the data surface. Specifically, as shown in FIG. 5, for the dummy cylinder 78, servo cylinder 76, and dummy cylinder 80 of the cylinder numbers −4, −5, and −6, respectively, the disk drive rewrites the servo cylinder information after erasing the information stored therein. Next, by processing at steps S408 to S517 (shown in FIG. 14), the disk drive saves and restores the system area information.

First, at step S408, the disk drive ensures the saving area of the system area information in the user area on the data surface. For this ensuring of the saving area, the disk drive performs a DC erasure at the positions of the saved cylinder, that is, at +0.5 P, 0, and −0.5 P, of the offtrack by using the offtrack correction value OFT2 detected when the amount of the offtrack neared the measurable limit of the offtrack as a reference. Further, the disk drive performs AC erasure at the position of zero offtrack.

This ensuring of the saving area to the user area is performed on the order of some minutes.

Next, at step S409, the disk drive writes the system area information into the saving cylinder. That is, using the current offtrack correction value OFT1 detected when the disk drive could read the system area information at step S403 or S405, or the offtrack correction value OFT2 detected when the amount of the offtrack neared the measurable limit of the offtrack, the disk drive reads the system area information in the system area cylinder.

The disk drive writes to the saving cylinder, similarly to the case of ensuring the saving area at step S408, using the offtrack correction value OFT2 detected when the amount of the offtrack neared the measurable limit of the offtrack. In this case, if the disk drive determines at step S410 that the disk drive cannot read the system area, the disk drive reports the abnormal end to the array controller 10 at step S522 shown in FIG. 14.

Next, the process proceeds to step S511, and the disk drive (for example, 14-1) reads the system area information. If reading the system area information is successful, the disk drive verifies whether the data coincides with the system area information in the system area cylinder. If the verification is successful at step S512, the process proceeds to step S513 to erase the system area cylinder.

Also, in this case, the disk drive performs the DC erasure at the positions of the system area cylinder, that is, at +0.5 P, 0, and −0.5 P, of the offtrack by using as a reference the offtrack correction value OFT2 detected when the amount of the offtrack neared the measurable limit of the offtrack. Further, the disk drive performs AC erasure at the position of zero offtrack.

After completion of erase processing of the system area cylinder, subsequently, at step S514, the disk drive reads the system area information from the saving area of the system area information, and the disk drive thereafter restores the system area information by writing the system are information into the system area cylinder which was completely erased.

Next, at step S514, based on the offtrack correction value detected when the amount of the offtrack neared the measurable limit of the offtrack, the disk drive verifies whether the disk drive can read the system area information restored into the system area cylinder after erasure. If the disk drive cannot read the system area information, the process proceeds from step S515 to step S522, where the disk drive reports the abnormal end to the array controller 10.

If the disk drive succeeds in verifying the reading of the system area information, at step S516, the disk drive restores the offtrack correction value to the former offtrack correction value OFT1. Subsequently, at step S516, the disk drive replaces the former offtrack correction value OFT1 with the offtrack correction value OFT2 detected when the amount of the offtrack neared the measurable limit of the offtrack. At step S517, the disk drive erases the saved offtrack information.

Subsequently, at steps S518 to S521, the disk drive performs format processing and defect search. First, at step S518, the disk drive erases the user area and system area. Here, the disk drive erases the system area except for the processed servo cylinder and system area cylinder. The disk drive performs the DC erasure for each cylinder at the positions of the cylinder, that is, at +0.5 P, 0, and −0.5 P, of the offtrack, and thereafter performs AC erasure at the position of zero offtrack.

Next, at step S519, the disk drive performs format processing of the user area and system area. After completion of the format processing, at step S520, the disk drive writes the predetermined verification pattern, and thereafter reads the predetermined verification pattern to perform format verification, what is called medium verification. A read error in this case is registered as a defect on a defect list. A conversion table is created showing an alternative cylinder to the defective cylinder.

Subsequently, at step S521, the disk drive performs the format processing of the user area and system area again using the defect list to normally end the processing corresponding to a series of reformat commands.

Figure 15:
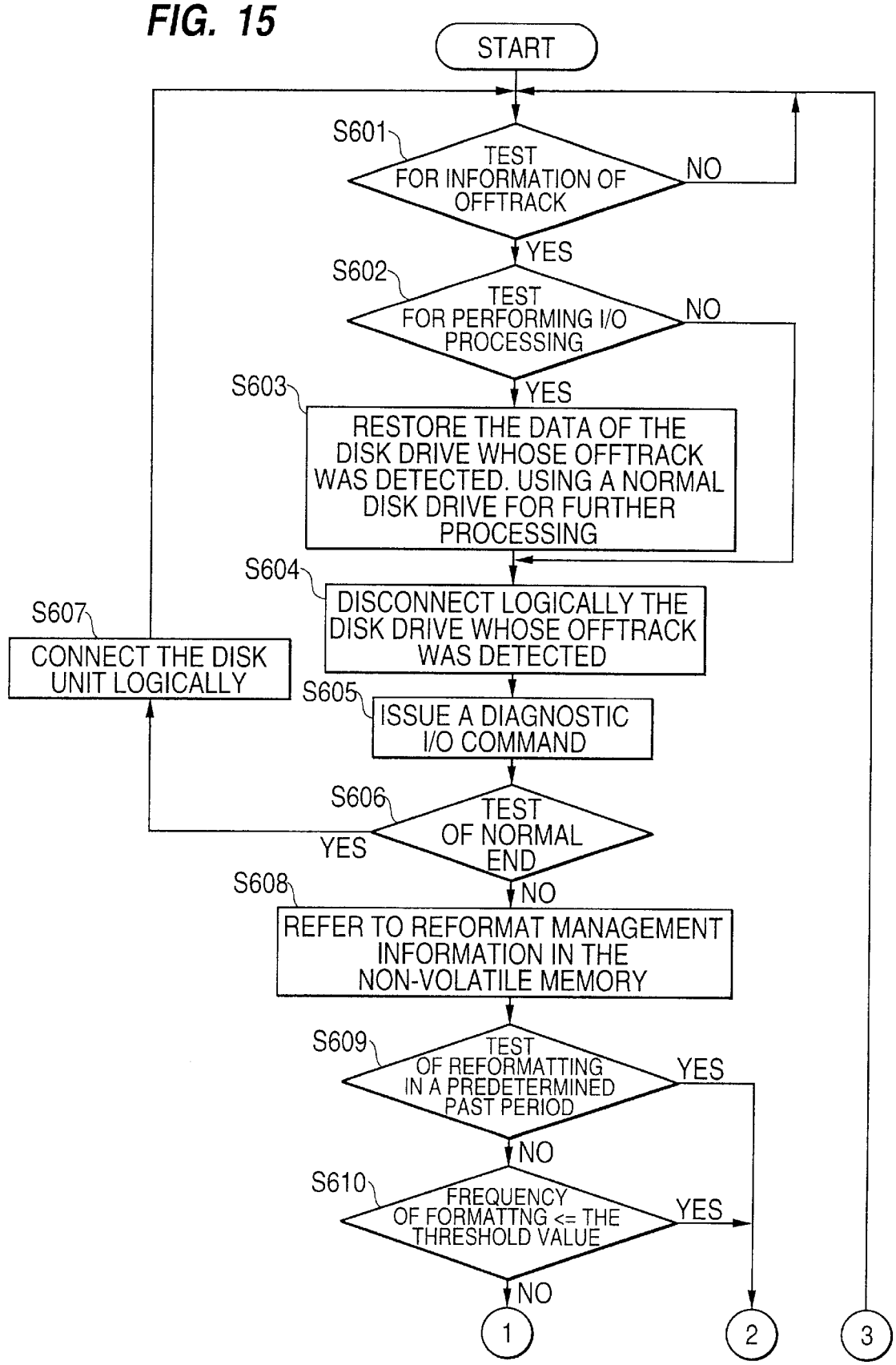
FIG. 15 is a flow chart of control processing in the array controller shown in FIG. 9 using reformat management information.
Figure 16:
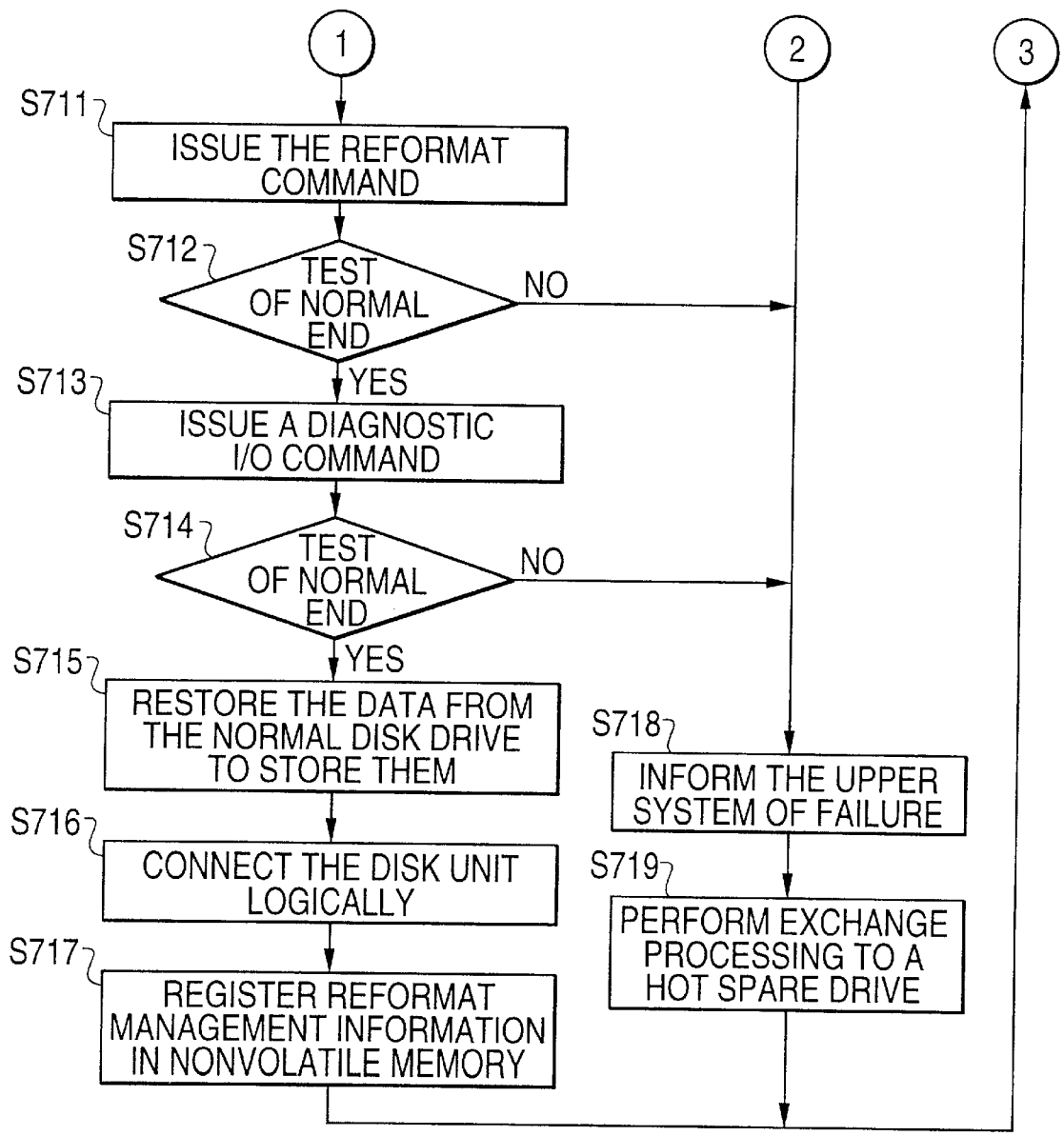
FIG. 16 is a flow chart (continued) of control processing in the array controller shown in FIG. 9 using reformat management information.

Flow charts in FIGS. 15 and 16 show control processing of the array controller 10 and the apparatus in the function block in FIG. 8. This processing determines whether the array controller 10 issues a reformat command referring to the reformat management information memory unit 74 provided in the non-volatile memory 34, when the array controller 10 issues the reformat command corresponding to the offtrack information from a disk drive.

In the flow charts shown in FIGS. 15 and 16, processing at steps S601 to S607 is the same as that at steps S101 to S107 shown in FIG. 10. In addition, processing at steps S711 to S719 in FIG. 16 is the same as that in steps S108 to S116 in FIG. 10. In this embodiment of the present invention, processing at steps S608 to S610 in FIG. 15 is newly-added.

That is, if, in the measurement processing of the offtrack in a disk drive corresponding to the issuance of a diagnostic I/O command at step S605, the process abnormally ends because the measured amount of the offtrack exceeds the measurable limit of the offtrack, the array controller 10 refers to the reformat management information memory unit 74 in the nonvolatile memory 34 at step S608.

The reformat management information memory unit 74 stores, for example, the date and time, and frequency of reformatting with the identification number of the disk drive as reformat management information as shown at step S717 in FIG. 16.

Then, at step S608, the array controller 10 refers to the reformat management information memory unit 74 using the identification number of the disk drive presently communicating the offtrack to read management information such as the time and frequency. Next, the process proceeds to step S609 to test using the time information whether reformatting was done during a predetermined period.

This period when reformatting is determined is set to be, for example, 24 hours. Hence, if reformatting was done during the past twenty-four hours, additional reformatting cannot dissolve (or overcome) the offtrack. Therefore, the process proceeds to step S618 in FIG. 15 to transmit to the upper interface failure information of the disk drive (for example, 14-1) having communicated the offtrack.

If reformatting was not done during the predetermined past period at step S609, the process proceeds to step S712 (in FIG. 16) to test whether the frequency of formatting reaches the threshold value. If the frequency reaches the threshold value, for example, five, the possibility of dissolution of the offtrack is very small. Hence, without reformatting, the process proceeds to step S718 in FIG. 16 to transmit to the upper interface the failure information of the disk drive having communicated the offtrack.

If reformatting was not done during the predetermined past period at step S609 or the frequency of reformatting is less than the threshold value up to that time, the process proceeds to step S711 in FIG. 16 for the first time, where the array controller 10 issues the reformat command to the disk drive having communicated the offtrack, to allow the disk drive to perform reformatting.

In the embodiment shown in FIGS. 15 and 16, in only the case in which reformatting has not been done during the predetermined period and the frequency of formatting is less than the threshold, the array controller 10 issues the reformat command to allow the disk drive having communicated the offtrack perform reformatting. However, in another embodiment of the present invention, the reformat command may be issued to allow the disk drive to perform reformatting in either of the following cases, one in which the reformatting has not been done during the predetermined period, and another in which the frequency of formatting is less than the threshold. In addition, in another embodiment of the present invention, either of the time information and frequency of formatting, not both, can be registered, and be used to decide whether additional reformatting is performed.

In addition, the above embodiment exemplifies, what is referred to as a two-phase servo system that records two types of servo patterns, having different cylinder phases, in the servo cylinder on the servo surface and data surface, and obtains a head position signal from the difference between two signals read from the two servo patterns. However, other servo methods such as a phase servo method can also be used, without departing from the present invention.

Further, in the above embodiment of the present invention, the array controller 10 issues the diagnostic I/O command from the MPU 18 of the array controller 10 to measure the amount of the offtrack when the array controller 10 receives the offtrack information from a disk drive. However, since measurement of the amount of the offtrack has been already completed in the stage of offtrack detection, without newly performing measurement processing, a disk drive may respond to the diagnostic I/O command using the measured amount of the offtrack. Furthermore, without issuing the diagnostic I/O command, a disk drive may perform reformat processing directly by issuing the reformat command.

As described above, according to the present invention, after an offtrack is detected in any of a plurality of disk drives comprising a disk array, the disk drive having the offtrack informs the array controller 10 of the offtrack. Then, a servo cylinder on a data surface is reformatted in reformat processing. Hence, the disk drive can dissolve the state that the offtrack exceeds the measurable limit of the offtrack in the servo cylinder. Further, without replacing the disk drive from the disk array for repair, the disk drive is restored to a usual operating state.

In addition, in processing reformatting of the disk drive having communicated the offtrack, the disk drive can respond to the access request from the upper system as restoring the data of the disconnected disk drive using the data of the normal disk drives. Further, although processing performance decreases a little bit, a disk array system can perform recovery of the disk drive having detected the offtrack by reformatting the disk drive without stopping access corresponding to the I/O request. Hence, stability and reliability of the disk array system are increased.

The present invention is not limited to the embodiments, described above, but also encompasses variations thereof.

A wide range of different working modes can be formed based on the present invention without deviating from the spirit and scope of the present invention. The present invention, therefore, is not restricted by its specific working modes except being limited by the appended charges.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A disk array system coupled to an upper system and comprising:

a disk array comprising a plurality of disk devices storing a plurality of data in parallel and redundant data used for restoring data lost if one of the plurality of data is lost;

an array controller controlling input from and output to said disk array based on a request transmitted from said upper system;

an offtrack detecting unit, included in each of said disk devices, detecting an offtrack and informing said array controller of the offtrack;

an error processing unit, included in said array controller, logically disconnecting a disk device having communicated information if offtrack detection information is received from said offtrack detecting unit, and issuing a diagnostic I/O command;

an offtrack measuring unit, included in each of said plurality of disk devices, measuring the offtrack from servo information recorded in an offtrack measurement cylinder, said offtrack measurement cylinder comprising a data surface corresponding to a data surface of an offtrack measurement cylinder on a servo surface, using the offtrack measurement cylinder on said servo surface of a disk medium as a reference if receiving the diagnostic I/O command from said error processing unit, and informing an abnormal end of the diagnostic command to said array controller if the measured value exceeds a measurable limit;

a reformat control unit included in said array controller and issuing a reformat command to the disk device if the unit receives the abnormal end of the diagnostic command from said offtrack measuring unit; and a reformat processing unit included in each of said disk devices and rewriting servo cylinder information onto said data surface of the disk medium if the reformat processing unit receives the reformat command from said reformat control unit.

2. The disk array system according to claim 1, wherein said offtrack detecting unit in each disk device measures an amount of offtrack by seeking said offtrack measurement cylinder at empty time, and informs said array controller of the offtrack if the measured value exceeds a threshold.

3. The disk array system according to claim 1, wherein said reformat processing unit saves system area information in a system cylinder area including an offtrack measurement cylinder to a user cylinder area, erases servo information in said offtrack measurement cylinder after saving, subsequently writes new servo information, erases the former area after writing the servo information, subsequently writes the servo information saved in said user cylinder area for restoration, and reformats the system cylinder area except said cylinder recording the servo information and system information, and user cylinder area in a state available to store data.

4. The disk array system according to claim 1, wherein said reformat processing unit records servo information for offtrack measurement at a cylinder position in an outer guard band area of a disk medium, and further records system information at another cylinder position in said outer guard band area.

5. The disk array system according to claim 1, wherein said reformat control unit of the array controller restores data from other disk devices if receiving a normal end of a command from said reformat processing unit of the disk device, subsequently writes the data in the disk device where reformatting normally ends, and thereafter connects the disk device logically to said disk array to enable the disk device to be reused.

6. The disk array system according to claim 1, wherein said array controller logically connects the disk device to said disk array to enable the disk device to be reused if said controller receives normal end of a diagnostic input and output (I/O) command from said disk device.

7. The disk array system according to claim 1, wherein said array controller informs an upper system of failure information of the disk device if said controller receives abnormal end of a reformat command from said disk device.

8. The disk array system according to claim 7, wherein said reformat management information memory unit is a non-volatile memory.

9. The disk array system according to claim 1, wherein said array controller further comprises a reformat management information memory unit storing information communicated after normal end of a diagnostic I/O command in said disk device, and said reformat control unit decides to issue a reformat command with referring to said reformat management information memory unit.

10. The disk array system according to claim 9, wherein said reformat management information memory unit stores time information of reformatting with identification information of a disk device, and, when said reformat control unit refers to said reformat management information memory unit, said reformat control unit issues said reformat command if elapsed time from the last reformatting exceeds a time limit, and, if said elapsed time is within the time limit, the reformat control unit informs the upper system of failure information of the disk device without issuing said reformat command.

11. The disk array system according to claim 10, wherein, if a disk device logically disconnected from said array controller is exchanged, said array controller clears information of the disk device being exchanged in said reformat management information memory unit for initialization.

12. The disk array system according to claim 9, wherein said reformat management information memory unit stores a frequency of reformatting with identification information of a disk device, and, when said reformat control unit refers to said reformat management information memory unit, if a last frequency of reformatting is less than a frequency limit, said reformat control unit issues said reformat command, and, if the last frequency of reformatting reaches the frequency limit, the reformat control unit informs the upper system of failure information of the disk device without issuing said reformat command.

13. The disk array system according to claim 12, wherein, if a disk device logically disconnected from said array controller is exchanged, said array controller clears information of the disk device being exchanged in said reformat management information memory unit for initialization.

14. The disk array system according to claim 9, wherein said reformat management information memory unit stores time and a frequency of reformatting with identification information of a disk device, and, when said reformat control unit refers to said reformat management information memory unit, if elapsed time from the last reformatting is less than a time limit and a last frequency of reformatting is less than a frequency limit, said reformat control unit issues said reformat command, and, if one of the time exceeds the time limit and the frequency reaches the frequency limit, the reformat control unit informs the upper system of failure information of the disk device without issuing said reformat command.

15. The disk array system according to claim 14, wherein, if a disk device logically disconnected from said array controller is exchanged, said array controller clears information of the disk device being exchanged in said reformat management information memory unit for initialization.

16. A disk array system comprising:
   a disk array comprising a plurality of disk devices storing a plurality of data in parallel and storing redundant data used for restoring data lost if one of the plurality of data is lost;
   an array controller controlling input from and output to said disk array based on request of an upper system;
   an offtrack detecting unit provided in each of said disk devices for detecting offtrack and informing said array controller of the offtrack;
   a reformat control unit provided in said array controller for issuing a reformat command to said disk device if the reformat control unit receives offtrack detection information from said offtrack detecting unit; and
   a reformat processing unit provided in each of said disk devices for rewriting servo cylinder information on said data surface of the disk medium if the unit receives the reformat command from said reformat control unit.

17. A disk array system comprising:
   a disk array comprising disk devices, each of the disk devices detecting an offtrack error in a corresponding one of the disk devices, measuring an amount of the offtrack, and determining whether the amount of the offtrack exceeds an offtrack limit based upon a track center; and
   an array controller, coupled to the disk array, issuing a command to the corresponding one of the disk devices to reformat itself if the amount of the offtrack exceeds the offtrack limit.

18. A method of overcoming an offtrack error in one of a plurality of disk devices in a disk array, comprising the steps of:
   determining by the one of the disk drives whether an amount of the offtrack exceeds an offtrack limit based upon a track center; and
   issuing by an array controller a command to the one of the plurality of disk devices to reformat itself if the amount of the offtrack exceeds the offtrack limit.

19. The method according to claim 18, further comprising the step of:
   storing data previously stored in the one of the plurality of disk devices in a hot spare disk device until the one of the plurality of disk devices reformats itself.

20. A disk array system comprising:
   a disk array comprising disk devices, each of the disk devices detecting an offtrack error in a corresponding one of the disk devices, measuring an amount of the offtrack, and determining whether the amount of the offtrack exceeds an offtrack limit based upon a track center; and
   an array controller, coupled to the disk array, issuing a command to the corresponding one of the disk devices to reformat itself if the amount of the offtrack exceeds the offtrack limit, said array controller determining whether the one of the disk devices is reformatted.

21. A method of overcoming an offtrack error in one of a plurality of disk devices in a disk array, comprising the steps of:
   determining by the one of the disk drives whether an amount of the offtrack exceeds an offtrack limit based upon a track center;
   issuing by an array controller a command to the one of the plurality of disk devices to reformat itself if the amount of the offtrack exceeds the offtrack limit; and
   determining by the array controller whether the one of the plurality of disk devices is reformatted.

22. A disk array system comprising:
   a disk array comprising disk devices, each of the disk devices detecting an offtrack error in a corresponding one of the disk devices, measuring an amount of the offtrack, and determining whether the amount of the offtrack exceeds an offtrack limit based upon a track center; and
   an array controller, coupled to the disk array, issuing a command to the corresponding one of the disk devices to reformat itself if the amount of the offtrack exceeds the offtrack limit, said array controller determining whether the corresponding one of the disk devices is reformatted, wherein the corresponding one of the disk devices reformats itself in response to the command.

23. A method of overcoming an offtrack error in one of a plurality of disk devices in a disk array, comprising the steps of:
   determining by the one of the disk drives whether an amount of the offtrack exceeds an offtrack limit based upon a track center;
   issuing by an array controller a command to the one of the plurality of disk devices to reformat itself if the amount of the offtrack exceeds the offtrack limit;
   reformatting by the one of the plurality of disk drives in response to the command; and
   determining by the array controller whether the one of the plurality of disk devices is reformatted.

* * * * *